United States Patent
Hirayama et al.

(10) Patent No.: US 7,512,055 B2
(45) Date of Patent: Mar. 31, 2009

(54) OBJECTIVE OPTICAL ELEMENT AND OPTICAL PICKUP APPARATUS

(75) Inventors: Hiroshi Hirayama, Musashino (JP); Tohru Kimura, Hachioji (JP)

(73) Assignee: Konica Minolta Opto, Inc. (JP)

( * ) Notice: Subject to any disclaimer, the term of this patent is extended or adjusted under 35 U.S.C. 154(b) by 571 days.

(21) Appl. No.: 11/133,349

(22) Filed: May 20, 2005

(65) Prior Publication Data

US 2005/0265150 A1   Dec. 1, 2005

(30) Foreign Application Priority Data

May 25, 2004  (JP) ............................. 2004-154702
Aug. 11, 2004  (JP) ............................. 2004-234297

(51) Int. Cl.
*G11B 7/00* (2006.01)

(52) U.S. Cl. ................................ 369/112.01; 369/44.37
(58) Field of Classification Search ............ 369/112.01, 369/112.26, 112.02, 112.1, 44.23, 44.24, 369/112.03, 44.37, 120, 121

See application file for complete search history.

(56) References Cited

U.S. PATENT DOCUMENTS 7,292,517 B2 * 11/2007 Hendriks et al. ....... 369/112.26

FOREIGN PATENT DOCUMENTS

| JP | 2000-20998 | 7/1998 |
|---|---|---|
| JP | 11-161997 | 6/1999 |
| JP | 2001-264533 | 9/2001 |
| JP | 2001-330770 | 11/2001 |

* cited by examiner

*Primary Examiner*—Nabil Z Hindi
(74) *Attorney, Agent, or Firm*—Finnegan, Henderson, Farabow, Garrett & Dunner, L.L.P.

(57) ABSTRACT

An objective optical element for use in an optical pickup apparatus having: a first light source for emitting a first light flux; a second light source for emitting a second light flux; an objective optical element, the objective optical element includes: an optical surface including a common area and an exclusive area; and a wavelength selective film formed on at least one of the common area and the exclusive area; wherein the common area transmits the first light flux which is formed into a converged spot on the information recording surface, and transmits the second light flux which is formed into a converged spot on the information recording surface, and the exclusive area transmits the first light flux which is formed into a converged spot on the information recording surface, and transmits the second light flux which is not formed into a converged spot on the information recording surface.

35 Claims, 14 Drawing Sheets

TRANSMITTANCE (%) VS WAVELENGTH (nm)

OBJECTIVE OPTICAL ELEMENT AND OPTICAL PICKUP APPARATUS

This application is based on Japanese Patent Application Nos. 2004-154702 filed on May 25, 2004, and 2004-234297 filed on Aug. 11, 2004 in Japanese Patent Office, the entire content of which is hereby incorporated by reference.

FIELD OF THE INVENTION

The present invention relates to an objective optical element and an optical pickup apparatus, and in particular, to an optical pickup apparatus capable of coping with optical information recording media in different types and to an objective optical element used in the optical pickup apparatus.

BACKGROUND OF THE INVENTION

There has been a rapid advance of research and development recently, for a high density optical disc system capable of conducting recording and reproducing of information by using a violet semiconductor laser having a wavelength of about 400 nm. As an example, on an optical disc conducting recording and reproducing of information under the specifications including NA 0.85 and light source wavelength 405 nm, namely, on the so-called Blu-ray Disc (BD), there can be recorded information of 20-30 GB per one side of the optical disc having a diameter of 12 cm that is the same in terms of size as DVD (whose specifications include NA 0.6, light source wavelength 650 nm and storage capacity 4.7 GB), and on an optical disc conducting recording and reproducing of information under the specifications including NA 0.65 and light source wavelength 405 nm, namely, on the so-called HD DVD, there can be recorded information of 15-20 GB per one side of the optical disc having a diameter of 12 cm. Hereafter, the optical disc of this kind is called "high density DVD" in the present specification.

Incidentally, if an optical pickup apparatus can only conduct recording and reproducing of information properly for the high density DVD of this kind, the commercial value of the optical pickup apparatus is not sufficient. When giving consideration to current realities where DVD and CD on which various pieces of information are recorded are on the market, it is not sufficient to be capable of conducting recording and reproducing of information properly for high density DVD only, and being capable of conducting recording and reproducing of information properly also for conventional DVD and CD owned by a user, for example, leads to enhancement of commercial value as an optical pickup apparatus of a compatibility type. From this background, an optical system used for the optical pickup apparatus of a compatibility type is required to obtain an excellent spot, for conducting recording and reproducing of information properly for any of high density DVD, and conventional DVD and CD. Though the optical pickup apparatus capable of conducting recording and/or reproducing of information on a compatibility basis for DVD and CD has been put to practical use, the apparatus is still demanded to be smaller in size, thinner in thickness and lower in cost.

When trying to conduct recording and/or reproducing of information for optical discs in different kinds in this case, there exists a problem that the aperture restriction corresponding to numerical aperture NA in the case of using each optical disc is needed. However, when trying to conduct the aperture restriction by using a mechanical shutter that makes an aperture diameter to be variable, the structure becomes complicated and cost increase is caused. For this problem, Patent Document 1 discloses a technology to place a glass flat plate covered by a wavelength selective film in front of an objective lens, and thereby to make the objective lens to have a function to regulate to the aperture corresponding to the wavelength of the light flux to be transmitted. Further, each of Patent Documents 2, 3 and 4 discloses a technology to cover directly the optical surface of the objective lens with a wavelength selective film, and thereby to give a function of aperture restriction to the objective lens.

(Patent Document 1) TOKKAIHEI No. 11-161997
(Patent Document 2) TOKKAI No. 2001-264533
(Patent Document 3) TOKKAI No. 2000-20998
(Patent Document 4) TOKKAI No. 2001-330770

However, in each of Patent Documents 1, 2 and 3, a function of aperture restriction is given selectively, concerning light fluxes respectively for DVD and CD in terms of wavelength. That is, there is neither disclosure nor suggestion, concerning the selective aperture restriction for a light flux with short wavelength of about 400 nm and for a light flux with wavelength other than the aforementioned wavelength. Further, the film described in Patent Document 4 does not transmit the light flux with short wavelength of about 400 nm, and it is difficult to use it for the aperture restriction concerning the light flux with short wavelength of about 400 nm.

SUMMARY OF THE INVENTION

The invention has been achieved, in view of the problems mentioned above, and its object is to provide an objective optical system capable of conducting aperture restriction properly even when using a light flux with a short wavelength and a light flux with a wavelength that is different from the foresaid wavelength, and to provide an optical pickup apparatus that uses the aforesaid objective optical system.

An objective optical element described in Item 1 is a structure for use in an optical pickup apparatus having: a first light source for emitting a first light flux with a wavelength $\lambda 1$ (380 nm$\leq \lambda 1 \leq$420 nm); a second light source for emitting a second light flux with a wavelength $\lambda 2$ ($\lambda 1 < \lambda 2$); an objective optical element for converging the first light flux on an information recording surface of a first optical information recording medium and converging the second light flux on an information recording surface of a second information recording medium. The objective optical element includes: an optical surface including a common area and an exclusive area; and a wavelength selective film formed on at least one of the common area and the exclusive area for transmitting at least one of the first light flux and a light flux with a wavelength excluding the wavelength $\lambda 1$ selectively. The common area transmits the first light flux which is formed into a converged spot on the information recording surface of the first optical information recording medium, and transmits the second light flux which is formed into a converged spot on the information recording surface of the second optical information recording medium, and the exclusive area transmits the first light flux which is formed into a converged spot on the information recording surface of the first optical information recording medium, and transmits the second light flux which is not formed into a converged spot on the information recording surface of the second optical information recording medium. Thereby, when relatively large numerical aperture NA of, for example, BD or HD DVD is needed, a light-convergent spot can be narrowed down by causing the light flux emitted from the first light source to be used therefor to pass through the exclusive area and the common area, and when relatively small numerical aperture NA of DVD and CD, on the other hand, is needed, a diameter of a light-convergent spot can be made appropriate by preventing a light flux emitted from the second light source to be used therefor from passing through the exclusive area. Incidentally, the "wavelength selective film" means a film whose transmittance is low for the light flux with the wavelength that is within a prescribed range and is high for the light flux with the wavelength that is outside the prescribed range.

An objective optical system described in Item 13 representing another preferred embodiment of the invention is a structure for use in an optical pickup apparatus having: a first light source for emitting a first light flux with a wavelength $\lambda 1$; a second light source for emitting a second light flux with a wavelength $\lambda 2$ ($\lambda 1 < \lambda 2$); an objective optical element for converging the first light flux on an information recording surface of a first optical information recording medium and converging the second light flux on an information recording surface of a second information recording medium. The objective optical element includes; a plurality of optical surfaces including an optical surface S2 with a curvature R2 closest to the optical information recording medium and an optical surface S1 with a curvature R1 secondary closest to the optical information recording medium, a common area and an exclusive area arranged on at least one of the plurality of optical surfaces; and a film arranged at least one of the common area and the exclusive area. The objective optical element satisfies R1>R2. The first light flux passes whole area of an effective diameter of the optical surface S1 and enters into a most outer periphery of an effective diameter of the optical surface S1 at an incident angle equal to 60 degrees or more. The common area transmits the first light flux which is formed into a converged spot on the information recording surface of the first optical information recording medium, and transmits the second light flux which is formed into a converged spot on the information recording surface of the second optical information recording medium. The exclusive area transmits the first light flux which is formed into a converged spot on the information recording surface of the first optical information recording medium, and transmits the second light flux which is not formed into a converged spot on the information recording surface of the second optical information recording medium. The film transmits the second light flux going from the second light source to the second optical information recording medium when the second light flux enters into the optical surface S1 at an angle less than a predetermined angle $\theta 2$, and does not transmit the second light flux going from the second light source to the second optical information recording medium when the second light flux enters into the optical surface S1 at an incident angle equal to the predetermined angle $\theta 2$ or more. The predetermined angle $\theta 2$ satisfies 25 degrees$\leq \theta 2 \leq$50 degrees.

Incidentally, in the present specification, "an angle of incidence" or "an incident angle" means an angle that is formed between a ray of light within an effective diameter of the objective optical element and a normal line on the surface, and "an angle of emergence" or "an emergence angle" means an angle formed between a light of emergence within an effective diameter of the objective optical element and a normal line on the surface. Further, when "the objective optical element" is composed of plural elements, an optical surface closest to the light source on the element closest to the optical information recording medium is handled as S1, and an optical surface on the optical information recording medium side is handled as S2 on the element closest to the optical information recording medium. Further, in the present specification, "an effective diameter" means a range of the optical surface which makes an incident light flux with working wavelength $\lambda$ to be transmitted or converged so that wavefront aberration may be within 0.07 $\lambda$rms.

The present structure is achieved by paying attention to that the maximum incident angle of the light flux with wavelength $\lambda 1$ and the maximum incident angle of the light flux with wavelength $\lambda 2$ are different each other, corresponding to aperture restriction. For example, when relatively large numerical aperture NA such as, for example, BD is required, the maximum incident angle of the light flux emitted from the first light source used therefor becomes 60° or mote, and therefore, the light flux having such maximum incident angle is made to be capable of narrowing down the light-converged spot by causing the light flux to pass through the exclusive area and the common area. On the other hand, when relatively small numerical aperture NA such as DVD and CD is required, an incident angle of the light flux emitted from the second light source used therefor becomes less than prescribed angle $\theta 2$ (provided that 25°$\leq \theta 2 \leq$50°), and therefore, the light flux having such incident angle is prevented by the film stated above from passing through the exclusive area, thus, an appropriate light-convergent spot can be formed.

An objective optical element described in Item 27 representing another preferred embodiment of the invention is a structure for use in an optical pickup apparatus having: a first light source for emitting a first light flux with a wavelength $\lambda 1$; a second light source for emitting a second light flux with a wavelength $\lambda 2$ ($\lambda 1 < \lambda 2$); an objective optical element for converging the first light flux on an information recording surface of a first optical information recording medium and converging the second light flux on an information recording surface of a second information recording medium. The objective optical element includes; a plurality of optical surfaces including an optical surface S2 with a curvature R2 closest to the optical information recording medium and an optical surface S1 with a curvature R1 secondary closest to the optical information recording medium, a common area and an exclusive area arranged on at least one of the plurality of optical surfaces; and a film arranged at least one of the common area and the exclusive area. The objective optical element satisfies R1>R2. The first light flux passes whole area of an effective diameter of the optical surface S2 and goes out of a most outer periphery of an effective diameter of the optical surface S2 at an emergence angle equal to 55 degrees or more. The common area transmits the first light flux which is formed into a converged spot on the information recording surface of the first optical information recording medium, and transmits the second light flux which is formed into a converged spot on the information recording surface of the second optical information recording medium. The exclusive area transmits the first light flux which is formed into a converged spot on the information recording surface of the first optical information recording medium, and transmits the second light flux which is not formed into a converged spot on the information recording surface of the second optical information recording medium. The film transmits the second light flux going from the second light source to the second optical information recording medium when the second light flux goes out from the optical surface S2 at an angle less than a predetermined angle $\theta 2'$, and does not transmit the second light flux going from the second light source to the second optical information recording medium when the second light flux goes out from the optical surface S2 at an angle equal to the predetermined angle $\theta 2'$ or more. The predetermined angle $\theta 2'$ satisfies 25 degrees$\leq \theta 2' \leq$50 degrees.

The present structure is achieved by paying attention to that the maximum emergence angle of the light flux with wavelength $\lambda 1$ and the maximum emergence angle of the light flux with wavelength λ2 are different each other, corresponding to aperture restriction. For example, when relatively large numerical aperture NA such as, for example, BD is required, the maximum emergence angle of the light flux emitted from the first light source used therefor becomes 55° or more, and therefore, the light flux having such maximum emergence angle is made to be capable of narrowing down the light-converged spot by causing the light flux to pass through the exclusive area and the common area. On the other hand, when relatively small numerical aperture NA such as DVD and CD is required, an angle of emergence of the light flux emitted from the second light source used therefore becomes to be less than the predetermined angle θ2' (provided that 25°≦θ2'≦50°), and therefore, the light flux having such angle of emergence is prevented by the film stated above from passing through the exclusive area, thus, an appropriate light-convergent spot can be formed.

An objective optical element described in Item 41 representing another preferred embodiment of the invention is a structure for use in an optical pickup apparatus having: a first light source for emitting a first light flux with a wavelength λ1; a second light source for emitting a second light flux with a wavelength λ2 (λ1<λ2); a third light source for emitting a third light flux with a wavelength λ3 (λ1<λ2<λ3 and 0.9<2×λ1/λ3<1.1); an objective optical element for converging the first light flux on an information recording surface of a first optical information recording medium, converging the second light flux on an information recording surface of a second information recording medium and, and converging the third light flux on an information recording surface of a third information recording medium. The objective optical element includes; a plurality of optical surfaces; an inner area arranged on an area from an optical axis to a first height of at least one of the plurality of optical surfaces, a middle area arranged on an area from the first height to a second height of at least one of the plurality of optical surfaces; an outer area arranged on an area outside of the second height of at least one of the plurality of optical surfaces; a film with a predefined optical property on at least one of the plurality of optical surfaces; and a diffractive structure on at least one of the plurality of optical surfaces. The film transmits the first light flux and the second light flux passing through the inner area, the middle area and the outer area, and does not transmit the third light flux passing through the middle area and the outer area. The diffractive structure makes the second light flux which has passed though the outer area into a flare light on the information recording surface of the second optical information recording medium. Thereby, it is possible to properly conduct recording and/or reproducing of information for an optical information recording medium by complementing characteristics such as, for example, wavelength-selectivity and an angle dependence by using diffracting characteristic of the diffractive structure and by using properly convergence and non-convergence of light fluxes respectively with different wavelengths on an information recording surface.

An objective optical element described in Item 53 representing another preferred embodiment of the invention is a structure for use in an optical pickup apparatus having: a first light source for emitting a first light flux with a wavelength λ1; a second light source for emitting a second light flux with a wavelength λ2 (λ1<λ2); a third light source for emitting a third light flux with a wavelength λ3 (λ1<λ2<λ3 and 0.9<2×λ1/λ3<1.1); an objective optical element for converging the first light flux on an information recording surface of a first optical information recording medium, converging the second light flux on an information recording surface of a second information recording medium and, converging the third light flux on an information recording surface of a third information recording medium. The objective optical element includes; a plurality of optical surfaces, an inner area arranged on an area from an optical axis to a first height of at least one of the plurality of optical surfaces, a middle area arranged on an area from the first height to a second height of at least one of the plurality of optical surfaces, an outer area arranged on an area outside of the second height of at least one of the plurality of optical surfaces, a wavelength selective film on at least one of the plurality of optical surfaces; and a diffractive-structure on at least one of the plurality of optical surfaces. The wavelength selective film transmits the first light flux and the second light flux passing through the inner area, the middle area and the outer area, and does not transmit the third light flux passing through the middle area and the outer area, and the diffractive structure makes the first light flux which has passed though the outer area into a flare light on the information recording surface of the first optical information recording medium. Thereby, it is possible to properly conduct recording and/or reproducing of information for an optical information recording medium by complementing characteristics such as, for example, wavelength-selectivity and an angle dependence by using diffracting characteristic of the diffractive structure and by using properly convergence and non-convergence of light fluxes respectively with different wavelengths on an information recording surface.

An objective optical element described in Item 65 representing another preferred embodiment of the invention is a structure for use in an optical pickup apparatus having: a first light source for emitting a first light flux with a wavelength λ1; a second light source for emitting a second light flux with a wavelength λ2 (λ1<λ2); a third light source for emitting a third light flux with a wavelength λ3 (λ1<λ2<λ3 and 0.9<2×λ1/λ3<1.1); an objective optical element for converging the first light flux on an information recording surface of a first optical information recording medium, converging the second light flux on an information recording surface of a second information recording medium and, converging the third light flux on an information recording surface of a third information recording medium. The objective optical element includes; a plurality of optical surfaces; an inner area arranged on an area from an optical axis to a first height of at least one of the plurality of optical surfaces; a middle area arranged on an area from the first height to a second height of at least one of the plurality of optical surfaces; an outer area arranged on an area outside of the second height of at least one of the plurality of optical surfaces; a third film arranged in the inner area; a second film arranged in the middle area; a third film arranged in the outer area. The third film transmits the first light flux, the second light flux, and the third light flux. The second film transmits the first light flux and the second light flux, and does not transmit the third light flux. The first film transmits the first light flux, and does not transmit the second light flux and the third light flux. Thereby, it is possible to properly conduct recording and/or reproducing of information for each optical information recording medium by changing, for example, the film thickness locally, and by using properly convergence and non-convergence of light fluxes respectively with three or more different wavelengths on an information recording surface, because only a light flux emitted from the first light source passes.

The invention makes it possible to provide an objective optical element for which an aperture restriction can be properly conducted even when using a light flux with a short wavelength or a light flux with a wavelength that is different from the short wavelength, and to provide an optical pickup apparatus employing the aforesaid objective optical element.

DETAILED DESCRIPTION OF THE INVENTION

Figure 1:
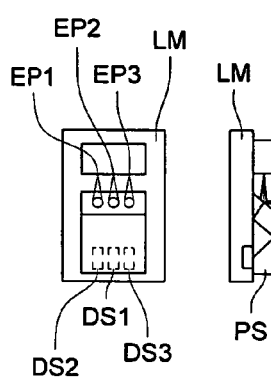
FIGS. 1(a) and 1(b) show a schematic cross section of an optical pickup apparatus capable of conducting recording and reproducing of information for an optical disc.
Figure 1:
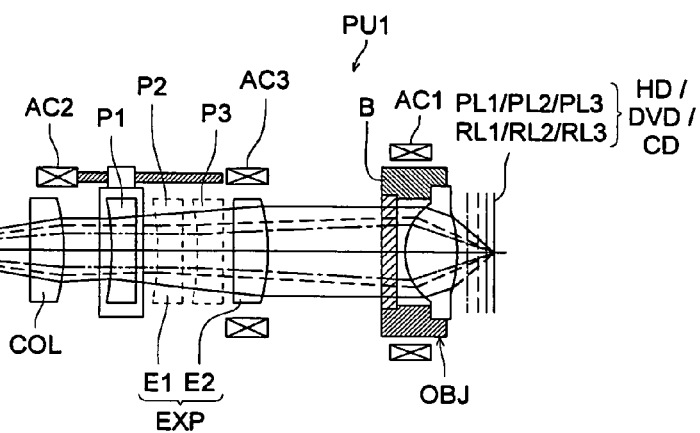

Preferred embodiments of the invention will be explained as follow.

In an objective optical element described in Item 2, it is preferable that the wavelength $\lambda 2$ satisfies 630 nm$\leq \lambda 2 \leq$670 nm in the structure described in Item 1. It is therefore possible to conduct recording and/or reproducing of information on a compatible basis, for example, between BD and DVD or between HD DVD and DVD.

In an objective optical element described in Item 3, it is preferable that the optical pickup apparatus further has a third light source for emitting a third light flux with wavelength $\lambda 3$ ($\lambda 1 < \lambda 2 < \lambda 3$), the objective optical element converges the third light flux on an information recording surface of the third optical information recording medium, and the wavelength $\lambda 3$ satisfies 760 nm$\leq \lambda 3 \leq$800 nm, in the structure described in Item 2. It is therefore possible to conduct recording and/or reproducing of information on a compatible basis, for example, for BD, DVD and CD, or for HD DVD, DVD and CD.

In an objective optical element described in Item 4, it is preferable that the objective optical element further includes a diffractive structure on an optical surface of the objective optical element for limiting a numerical aperture for the second light flux, in the structure described in Item 3. Therefore, it is possible to properly conduct recording and/or reproducing of information for an optical information recording medium by combining a wavelength selective film and a diffractive structure and thereby by using properly convergence and non-convergence of light fluxes respectively with three or more different wavelengths on an information recording surface.

In the present specification, "a diffractive structure for restricting an aperture" or "a diffractive structure for limiting a numerical aperture" means that light with a specific wavelength entering the diffractive structure is made to be a flare on an information recording surface. In the present specification, "flare component (flare light)" means a light flux with a numerical aperture that is not less than the prescribed numerical aperture that has been subjected to actions which do not contribute to formation of spots necessary for recording or reproducing on a prescribed information recording surface, and it means, for example, a light flux causing aberration with wavefront aberration of not less than 0.07 $\lambda$rms ($\lambda$ represents a wavelength in the case of using CD, in this case) for incident light flux corresponding to the numerical aperture of 0-0.43 necessary for conducting recording or reproducing for CD, or to the numerical aperture higher than 0.45, in the case of recording or reproducing for CD. "Making to be a flare" means that the incident light flux is made to be of characteristics to irradiate an information recording surface with a light flux that causes aberration.

In an objective optical element described in Item 5, it is preferable that the objective optical element further includes a diffractive structure on an optical surface of the objective optical element for limiting a numerical aperture for each of the first light flux and the third light flux, in the structure described in Item 3. Since $\lambda 3$ is about twice as long as $\lambda 1$, there is an occasion that diffracting actions of the diffractive structure become common. It is therefore possible to use properly convergence and non-convergence of light fluxes respectively with three or more different wavelengths on an information recording surface.

In an objective optical element described in Item 6, it is preferable that the common area includes an optical axis and the exclusive area is arranged outside of the common area, in the structure described in any one of Items 1-5.

In an objective optical element described in Item 7, the wavelength selective film is formed of one type of film having a same layer construction within an optical surface including wavelength selective film of the objective optical element, in the structure described in any one of Items 1-6.

In an objective optical element described in Item 8, it is preferable that an optical surface including the wavelength selective film of the objective optical element is a plane surface, the wavelength selective film transmits the third light flux going toward the third optical information recording medium when the third light flux goes from the optical surface including the wavelength selective film to outside of the objective optical element at an angle less than a predetermined angle θ3e, and does not transmit the third light flux going toward the third optical information recording medium when the third light flux goes from the optical surface including the wavelength selective film to outside of the objective optical element at an angle equal to the predetermined angle θ3e or more, and the predetermined angle θ3e satisfies 25 degrees≦θ3e≦35 degrees, in the structure described in any one of Items 3-7.

In an objective optical element described in Item 9, it is preferable that an optical surface including the wavelength selective film of the objective optical element is a plane surface, the wavelength selective film transmits the third light flux reflected by the information recording surface of the third optical information recording medium when the third light flux enters from outside of the objective optical element into the optical surface including the wavelength selective film at an angle less than a predetermined angle θ3f, and does not transmit the third light flux reflected by the information recording surface of the third optical information recording medium when the third light flux enters from outside of the objective optical element into the optical surface including the wavelength selective film at an angle equal to the predetermined angle θ3f or more, and the predetermined angle θ3f satisfies 25 degrees≦θ3f≦35 degrees, in the structure described in any one of Items 3-8.

In an objective optical element described in Item 10, it is preferable that an optical surface including the wavelength selective film of the objective optical element is a curved surface, the wavelength selective film transmits the third light flux going toward the third optical information recording medium when the third light flux enters from outside of the objective optical element into the optical surface including the wavelength selective film at an angle less than a predetermined angle θ3g, and does not transmit the third light flux going toward the third optical information recording medium when the third light flux enters from outside of the objective optical element into the optical surface including the wavelength selective film at an angle equal to the predetermined angle θ3g or more, and the predetermined angle θ3g satisfies 40 degrees≦θ3g≦50 degrees, in the structure described in any one of Items 3-9.

In an objective optical element described in Item 11, it is preferable that an optical surface including the wavelength selective film of the objective optical element is a curved surface, the wavelength selective film transmits the third light flux reflected by the information recording surface of the third optical information recording medium when the third light flux goes from the optical surface including the wavelength selective film to outside of the objective optical element at an angle less than a predetermined angle θ3h, and does not transmit the third light flux reflected by the information recording surface of the third optical information recording medium when the third light flux goes from the optical surface including the wavelength selective film to outside of the objective optical element at an angle equal to the predetermined angle θ3h or more, and the predetermined angle θ3h satisfies 40 degrees≦θ3h≦50 degrees, in the structure described in any one of Items 3-10.

In an objective optical element described in Item 12, it is preferable that a circular polarized light flux enters the objective optical element, in the structure described in any one of Items 1-11.

In an objective optical element described in Item 14, it is preferable that the film mentioned above is arranged on the optical surface S1, in the structure described in Item 13.

In an objective optical element described in Item 15, it is preferable that the film mentioned above is arranged on the optical surface S2, in the structure described in Item 13. When curvature R1 of the optical surface S1 is greater than curvature R2 of the optical surface S2, there is a merit that a uniform film can easily be made, when the film is formed on the optical surface S1 through sputtering for example.

In an objective optical element described in Item 16, it is preferable that the second light flux enters into a most outer periphery of an effective diameter of the optical surface S1 at an incident angle equal to 45 degrees or more, and less than 60 degrees, in the structure described in any one of Items 13-15. Accordingly, it is possible to conduct recording and/or reproducing of information on a compatible basis for BD and DVD, for example.

In an objective optical element described in Item 17, it is preferable that the optical pickup apparatus further has a third light source for emitting a third light flux with wavelength λ3 (λ1<λ2<λ3), and the objective optical element converges the third light flux on an information recording surface of the third optical information recording medium, while, the third light flux enters into a most outer periphery of an effective diameter of the optical surface S1 at an incident angle that is equal to 30 degrees or more, and is less than 50 degrees, in the structure described in any one of Items 13-16. It is therefore possible to conduct recording and/or reproducing of information on a compatible basis, for example, for BD, DVD and CD.

In an objective optical element described in Item 18, it is preferable that the objective optical element further includes a diffractive structure arranged on one of the plurality of optical surfaces for limiting a numerical aperture for the second light flux, in the structure described in Item 17. Therefore, it is possible to properly conduct recording and/or reproducing of information for an optical information recording medium by complementing characteristics of the wavelength selective film by using characteristics of the diffractive structure and by using properly convergence and non-convergence of light fluxes respectively with different wavelengths on an information recording surface.

In an objective optical element described in Item 19, it is preferable that the objective optical element further includes a diffractive structure arranged on one of the plurality of optical surfaces for limiting a numerical aperture for each of the first light flux and the third light flux, in the structure described in Item 17 or Item 18. Therefore, it is possible to properly conduct recording and/or reproducing of information for an optical information recording medium by complementing characteristics of the wavelength selective film by using characteristics of the diffractive structure and by using properly convergence and non-convergence of light fluxes respectively with different wavelengths on an information recording surface.

In an objective optical element described in Item 20, it is preferable that the common area includes an optical axis and the exclusive area is arranged outside of the common area, in the structure described in any one of Items 13-19.

In an objective optical element described in Item 21, the film is formed of one type of film having a same layer construction within an optical surface including the film of the objective optical element, in the structure described in any one of Items 13-20.

In an objective optical element described in Item 22, it is preferable that an optical surface including the film of the objective optical element is a plane surface, the film transmits the third light flux going toward the third optical information recording medium when the third light flux goes from the optical surface including the film to outside of the objective optical element at an angle less than a predetermined angle θ3e, and does not transmit the third light flux going to the third optical information recording medium when the third light flux goes from the optical surface including the film to outside of the objective optical element at an angle equal to the predetermined angle θ3e or more, and the predetermined angle θ3e satisfies 25 degrees≦θ3e≦35 degrees, in the structure described in any one of Items 17-33.

In an objective optical element described in Item 23, it is preferable that an optical surface including the film of the objective optical element is a plane surface, the film transmits the third light flux reflected by the information recording surface of the third optical information recording medium when the third light flux enters from outside of the objective optical element into the optical surface including the wavelength selective film at an angle less than a predetermined angle θ3f, and does not transmit the third light flux reflected by the information recording surface of the third optical information recording medium when the third light flux enters from outside of the objective optical element into the optical surface including the wavelength selective film at an angle equal to the predetermined angle θ3f or more, and the predetermined angle θ3f satisfies 25 degrees≦θ3f≦35 degrees, in the structure described in any one of Items 17-22.

In an objective optical element described in Item 24, it is preferable that an optical surface including the film of the objective optical element is a curved surface, the film transmits the third light flux going toward the third optical information recording medium when the third light flux enters from outside of the objective optical element into the optical surface including the wavelength selective film at an angle less than a predetermined angle θ3g, and does not transmit the third light flux going toward the third optical information recording medium when the third light flux enters from outside of the objective optical element into the optical surface including the wavelength selective film at an angle equal to the predetermined angle θ3g or more, and the predetermined angle θ3g satisfies 40 degrees≦θ3g≦50 degrees, in the structure described in any one of Items 17-23.

In an objective optical element described in Item 25, it is preferable that an optical surface including the film of the objective optical element is a curved surface, the film transmits the third light flux reflected by the information recording surface of the third optical information recording medium when the third light flux goes from the optical surface including the wavelength selective film to outside of the objective optical element at an angle less than a predetermined angle θ3h, and does not transmit the third light flux reflected by the information recording surface of the third optical information recording medium when the third light flux goes from the optical surface including the wavelength selective film to outside of the objective optical element at an angle equal to the predetermined angle θ3h or more, and the predetermined angle θ3h satisfies 40 degrees≦θ3h≦50 degrees, in the structure described in any one of Items 17-24.

In an objective optical element described in Item 26, it is preferable that a circular polarized light flux enters the objective optical element, in the structure described in any one of Items 13-25.

In an objective optical element described in Item 28, it is preferable that the film is arranged on the optical surface S1, in the structure described in Items 27.

In an objective optical element described in Item 29, it is preferable that the film is arranged on the optical surface S2, in the structure described in Items 27. When curvature R1 of the optical surface S1 is greater than curvature R2 of the optical surface S2, there is a merit, for example, that a uniform film can easily be formed when forming the film on the optical surface S1 through sputtering or the like.

In an objective optical element described in Item 30, it is preferable that the second light flux goes out of a most outer periphery of an effective diameter of the optical surface S2 at an emergence angle equal to 35 degrees or more, and less than 60 degrees, in the structure described in any one of Items 27-29. It is therefore possible to conduct recording and/or reproducing of information for BD and DVD on a compatible basis.

In an objective optical element described in Item 31, it is preferable that the optical pickup apparatus further has a third light source for emitting a third light flux with wavelength λ3 (λ1<λ2<λ3), and the objective optical element converges the third light flux on an information recording surface of the third optical information recording medium, while, the third light flux goes out of a most outer periphery of an effective diameter of the optical surface S2 at an emergence angle equal to 20 degrees or more, and less than 35 degrees, in the structure described in any one of Items 27-30. It is therefore possible to conduct recording and/or reproducing of information on a compatible basis, for example, for BD, DVD and CD.

In an objective optical element described in Item 32, it is preferable that the objective optical element further includes a diffractive structure arranged on one of the plurality of optical surfaces for limiting a numerical aperture for the second light flux, in the structure described in Item 31. Therefore, it is possible to properly conduct recording and/or reproducing of information for an optical information recording medium by complementing characteristics of the wavelength selective film by using characteristics of the diffractive structure and by using properly convergence and non-convergence of light fluxes respectively with different wavelengths on an information recording surface.

In an objective optical element described in Item 33, it is preferable that the objective optical element further comprising: a diffractive structure arranged on one of the plurality of optical surfaces for limiting a numerical aperture for each of the first light flux and the third light flux, in the structure described in Item 31 or Item 32. Therefore, it is possible to properly conduct recording and/or reproducing of information for an optical information recording medium by complementing characteristics of the wavelength selective film by using characteristics of the diffractive structure and by using properly convergence and non-convergence of light fluxes respectively with different wavelengths on an information recording surface.

In an objective optical element described in Item 34, it is preferable that the common area is provided within a range including an optical axis of the objective optical element, and the exclusive area is arranged outside the common area, in the structure described in any one of Items 27-33.

In an objective optical element described in Item 35, the film is formed of one type of film having a same layer construction within an optical surface including the film of the objective optical element, in the structure described in any one of Items 27-34.

In an objective optical element described in Item 36, it is preferable that an optical surface including the film of the objective optical element is a plane surface, the film transmits the third light flux going toward the third optical information recording medium when the third light flux goes from the optical surface including the film to outside of the objective optical element at an angle less than a predetermined angle θ3e, and does not transmit the third light flux going to the third optical information recording medium when the third light flux goes from the optical surface including the film to outside of the objective optical element at an angle equal to the predetermined angle θ3e or more, and the predetermined angle θ3e satisfies 25 degrees≦θ3e≦35 degrees, in the structure described in any one of Items 31-34.

In an objective optical element described in Item 37, it is preferable that the optical surface including the film of the objective optical element is a plane surface, the film transmits the third light flux reflected by the information recording surface of the third optical information recording medium when the third light flux enters from outside of the objective optical element into the optical surface including the wavelength selective film at an angle less than a predetermined angle θ3f, and does not transmit the third light flux reflected by the information recording surface of the third optical information recording medium when the third light flux enters from outside of the objective optical element into the optical surface including the film at an angle equal to the predetermined angle θ3f or more, and the predetermined angle θ3f satisfies 25 degrees≦θ3f≦35 degrees, in the structure described in any one of Items 31-34.

In an objective optical element described in Item 38, it is preferable that an optical surface including the film of the objective optical element is a curved surface, the film transmits the third light flux going toward the third optical information recording medium when the third light flux enters from outside of the objective optical element into the optical surface including the film at an angle less than a predetermined angle θ3g, and does not transmit the third light flux going toward the third optical information recording medium when the third light flux enters from outside of the objective optical element into the optical surface including the film at an angle equal to the predetermined angle θ3g or more, and the predetermined angle θ3g satisfies 40 degrees≦θ3g≦50 degrees, in the structure described in any one of Items 31-37.

In an objective optical element described in Item 39, it is preferable that an optical surface including the film of the objective optical element is a curved surface, the film transmits the third light flux reflected by the information recording surface of the third optical information recording medium when the third light flux goes from the optical surface including the film to outside of the objective optical element at an angle less than a predetermined angle θ3h, and does not transmit the third light flux reflected by the information recording surface of the third optical information recording medium when the third light flux goes from the optical surface including the film to outside of the objective optical element at an angle equal to the predetermined angle θ3h or more, and the predetermined angle θ3h satisfies 40 degrees≦θ3h≦50 degrees, in the structure described in any one of Items 31-38.

In an objective optical element described in Item 40, it is preferable that a circular polarized light flux enters the objective optical element, in the structure described in any one of Items 27-39.

In an objective optical element described in Item 42, it is preferable that the film has wavelength-selectivity so as to transmit at least one of the first and third fluxes, and the third light flux selectively, in the structure described in Item 41, which makes it possible to conduct aperture restriction properly when, for example, CD is used.

In an objective optical element described in Item 43, it is preferable that when an optical surface S1 is one of the plurality of optical surfaces which is secondary closest to the optical information recording medium, the film transmits the third light flux going toward the third optical information recording medium when the third light flux enters from a light-source side of the objective optical element into the optical surface S1 at an angle less than a predetermined angle θ3a, and does not transmit the third light flux going toward the third optical information recording medium when the third light flux enters from the light-source side into the optical surface S1 at an angle equal to the predetermined angle θ3a or more, and the predetermined angle θ3a satisfies 40 degrees≦θ3a≦50 degrees, in the structure described in Item 41 or Item 42. Thus, it is possible to restrict an aperture properly when CD is used by eliminating unwanted light in, for example, incident light.

In an objective optical element described in Item 44, it is preferable that when an optical surface S2 is one of the plurality of optical surfaces which is closest to the optical information recording medium, the film transmits the third light flux going toward the third optical information recording medium when the third light flux goes out from the optical surface S2 to an optical-information-recording-medium side of the objective element at an angle less than a predetermined angle θ3b, and does not transmit the third light flux going toward the third optical information recording medium when the third light flux goes out from the optical surface S2 to an optical-information-recording-medium side of the objective element at an angle equal to the predetermined angle θ3b or more, and the predetermined angle θ3b satisfies 25 degrees≦θ3b≦35 degrees in the structure described in any one of Items 41-43. Thus, it is possible to restrict an aperture properly when CD is used by eliminating unwanted light in, for example, incident light.

In an objective optical element described in Item 45, it is preferable that when an optical surface S2 is one of the plurality of optical surfaces which is closest to the optical information recording medium, the film transmits the third light flux reflected by the information recording surface of the third optical information recording medium when the third light flux enters from an optical-information-recording-medium side of the objective element into the optical surface S2 at an angle less than a predetermined angle θ3c, and does not transmit the third light flux reflected by the information recording surface of the third optical information recording medium when the third light flux enters from the optical-information-recording-medium side of the objective element into the optical surface S2 at an angle equal to the predetermined angle θ3c or more, and the predetermined angle θ3c satisfies 25 degrees≦θ3c≦35 degrees, in the structure described in Item 41 or Item 42. Thus, it is possible to improve the detecting accuracy of a photodetector by eliminating unwanted light in reflected light coming from, for example, the optical information recording medium.

In an objective optical element described in Item 46, it is preferable that when an optical surface S1 is one of the plurality of optical surfaces which is secondary closest to the optical information recording medium, the film transmits the third light flux reflected by the information recording surface of the third optical information recording medium when the third light flux goes out from the optical surface S1 to a light-source side of the objective element at an angle less than a predetermined angle θ3d, and does not transmit the third light flux reflected by the information recording surface of the third optical information recording medium when the third light flux goes out from the optical surface S1 to a light source side of the objective element at an angle equal to the predetermined angle θ3d or more, and the predetermined angle θ3d satisfies 40 degrees≦θ3d≦50 degrees, in the structure described in any one of Items 41, 42 and 45. Thus, it is possible to improve the detecting accuracy of a photodetector by eliminating unwanted light in reflected light coming from, for example, the optical information recording medium.

In an objective optical element described in Item 47, the film is formed of one type of film having a same layer construction within an optical surface including the film of the objective optical element, in the structure described in any one of Items 41-46.

In an objective optical element described in Item 48, it is preferable that an optical surface including the film of the objective optical element is a plane surface, the film transmits the third light flux going toward the third optical information recording medium when the third light flux goes from the optical surface including the film to outside of the objective optical element at an angle less than a predetermined angle $\theta 3e$, and does not transmit the third light flux going to the third optical information recording medium when the third light flux goes from the optical surface including the film to outside of the objective optical element at an angle equal to the predetermined angle $\theta 3e$ or more, and the predetermined angle $\theta 3e$ satisfies 25 degrees$\leqq \theta 3e \leqq$35 degrees, in the structure described in any one of Items 41-47.

In an objective optical element described in Item 49, it is preferable that an optical surface including the film of the objective optical element is a plane surface, the film transmits the third light flux reflected by the information recording surface of the third optical information recording medium when the third light flux enters from outside of the objective optical element into the optical surface including the film at an angle less than a predetermined angle $\theta 3f$, and does not transmit the third light flux reflected by the information recording surface of the third optical information recording medium when the third light flux enters from outside of the objective optical element into the optical surface including the film at an angle equal to the predetermined angle $\theta 3f$ or more, and the predetermined angle $\theta 3f$ satisfies 25 degrees$\leqq \theta 3f \leqq$35 degrees, in the structure described in any one of Items 41-48.

In an objective optical element described in Item 50, it is preferable that an optical surface including the film of the objective optical element is a curved surface, the film transmits the third light flux going toward the third optical information recording medium when the third light flux enters from outside of the objective optical element into the optical surface including the film at an angle less than a predetermined angle $\theta 3g$, and does not transmit the third light flux going toward the third optical information recording medium when the third light flux enters from outside of the objective optical element into the optical surface including the film at an angle equal to the predetermined angle $\theta 3g$ or more, and the predetermined angle $\theta 3g$ satisfies 40 degrees$\leqq \theta 3g \leqq$50 degrees, in the structure described in any one of Items 41-49.

In an objective optical element described in Item 51, it is preferable that an optical surface including the film of the objective optical element is a curved surface, the film transmits the third light flux reflected by the information recording surface of the third optical information recording medium when the third light flux goes from the optical surface including the film to outside of the objective optical element at an angle less than a predetermined angle $\theta 3h$, and does not transmit the third light flux reflected by the information recording surface of the third optical information recording medium when the third light flux goes from the optical surface including the film to outside of the objective optical element at an angle equal to the predetermined angle $\theta 3h$ or more, and the predetermined angle $\theta 3h$ satisfies 40 degrees$\leqq \theta 3h \leqq$50 degrees, in the structure described in any one of Items 41-50.

In an objective optical element described in Item 52, it is preferable that a circular polarized light flux enters the objective optical element, in the structure described in any one of Items 41-51.

In an objective optical element described in Item 54, it is preferable that the wavelength selective film has wavelength-selectivity that makes a first light flux, a second light flux and a third light flux to be transmitted selectively, in the structure described in Item 53, which makes it possible to conduct aperture restriction properly when, for example, CD is used.

In an objective optical element described in Item 55, it is preferable that when an optical surface S1 is one of the plurality of optical surfaces which is secondary closest to the optical information recording medium, the wavelength selective film transmits the third light flux going toward the third optical information recording medium when the third light flux enters from a light-source side of the objective optical element into the optical surface S1 at an angle less than a predetermined angle $\theta 3a$, and does not transmit the third light flux going toward the third optical information recording medium when the third light flux enters from the light-source side into the optical surface S1 at an angle equal to the predetermined angle $\theta 3a$ or more, and the predetermined angle $\theta 3a$ satisfies 40 degrees$\leqq \theta 3a \leqq$50 degrees, in the structure described in Item 53 or Item 54. Thus, it is possible to restrict an aperture properly when CD is used by eliminating unwanted light in, for example, incident light.

In an objective optical element described in Item 56, it is preferable that when an optical surface S2 is one of the plurality of optical surfaces which is closest to the optical information recording medium, the wavelength selective film transmits the third light flux going toward the third optical information recording medium when the third light flux goes out from the optical surface S2 to an optical-information-recording-medium side of the objective element at an angle less than a predetermined angle $\theta 3b$, and does not transmit the third light flux going toward the third optical information recording medium when the third light flux goes out from the optical surface S2 to an optical-information-recording-medium side of the objective element at an angle equal to the predetermined angle $\theta 3b$ or more, and the predetermined angle $\theta 3b$ satisfies 25 degrees$\leqq \theta 3b \leqq$35 degrees in the structure described in any one of Items 53-55. Thus, it is possible to restrict an aperture properly when CD is used by eliminating unwanted light in, for example, incident light.

In an objective optical element described in Item 57, it is preferable that when an optical surface S2 is one of the plurality of optical surfaces which is closest to the optical information recording medium, the wavelength selective film transmits the third light flux reflected by the information recording surface of the third optical information recording medium when the third light flux enters from an optical-information-recording-medium side of the objective element into the optical surface S2 at an angle less than a predetermined angle $\theta 3c$, and does not transmit the third light flux reflected by the information recording surface of the third optical information recording medium when the third light flux enters from the optical-information-recording-medium side of the objective element into the optical surface S2 at an angle equal to the predetermined angle $\theta 3c$ or more, and the predetermined angle. $\theta 3c$ satisfies 25 degrees$\leqq \theta 3c \leqq$35 degrees, in the structure described in Item 53 or Item 54. Thus, it is possible to improve the detecting accuracy of a photodetector by eliminating unwanted light in reflected light coming from, for example, the optical information recording medium.

In an objective optical element described in Item 58, it is preferable that when an optical surface S1 is one of the plurality of optical surfaces which is secondary closest to the optical information recording medium, the wavelength selective film transmits the third light flux reflected by the information recording surface of the third optical information recording medium when the third light flux goes out from the optical surface S1 to a light-source side of the objective element at an angle less than a predetermined angle θ3d, and does not transmit the third light flux reflected by the information recording surface of the third optical information recording medium when the third light flux goes out from the optical surface S1 to a light source side of the objective element at an angle equal to the predetermined angle θ3d or more, and the predetermined angle θ3d satisfies 40 degrees≦θ3d≦50 degrees, in the structure described in any one of Items 53, 54 and 57. Thus, it is possible to improve the detecting accuracy of a photodetector by eliminating unwanted light in reflected light coming from, for example, the optical information recording medium.

In an objective optical element described in Item 59, the wavelength selective film is formed of one type of film having a same layer construction within an optical surface including the wavelength selective film of the objective optical element, in the structure described in any one of Items 53-58.

In an objective optical element described in Item 60, it is preferable that an optical surface including the wavelength selective film is a plane surface, the wavelength selective film transmits the third light flux going toward the third optical information recording medium when the third light flux goes from the optical surface including the wavelength selective film to outside of the objective optical element at an angle less than a predetermined angle θ3e, and does not transmit the third light flux going toward the third optical information recording medium when the third light flux goes from the optical surface including the wavelength selective film to outside of the objective optical element at an angle equal to the predetermined angle θ3e or more, and the predetermined angle θ3e satisfies 25 degrees≦θ3e≦35 degrees, in the structure described in any one of Items 53-59.

In an objective optical element described in Item 61, it is preferable that an optical surface including the wavelength selective film is a plane surface, the wavelength selective film transmits the third light flux reflected by the information recording surface of the third optical information recording medium when the third light flux enters from outside of the objective optical element into the optical surface including the wavelength selective film at an angle less than a predetermined angle θ3f, and does not transmit the third light flux reflected by the information recording surface of the third optical information recording medium when the third light flux enters from outside of the objective optical element into the optical surface including the wavelength selective film at an angle equal to the predetermined angle θ3f or more, and the predetermined angle θ3f satisfies 25 degrees≦θ3f≦35 degrees, in the structure described in any one of Items 53-60.

In an objective optical element described in Item 62, it is preferable that an optical surface including the wavelength selective film is a curved surface, the wavelength selective film transmits the third light flux going toward the third optical information recording medium when the third light flux enters from outside of the objective optical element into the optical surface including the wavelength selective film at an angle less than a predetermined angle θ3g, and does not transmit the third light flux going toward the third optical information recording medium when the third light flux enters from outside of the objective optical element into the optical surface including the wavelength selective film at an angle equal to the predetermined angle θ3g or more, and the predetermined angle θ3g satisfies 40 degrees≦θ3g≦50 degrees, in the structure described in any one of Items 53-61.

In an objective optical element described in Item 63, it is preferable that an optical surface including the wavelength selective film is a curved surface, the wavelength selective film transmits the third light flux reflected by the information recording surface of the third optical information recording medium when the third light flux goes from the optical surface including the wavelength selective film to outside of the objective optical element at an angle less than a predetermined angle θ3h, and does not transmit the third light flux reflected by the information recording surface of the third optical information recording medium when the third light flux goes from the optical surface including the wavelength selective film to outside of the objective optical element at an angle equal to the predetermined angle θ3h or more, and the predetermined angle θ3h satisfies 40 degrees≦θ3h≦50 degrees, in the structure described in any one of Items 53-62.

In an objective optical element described in Item 64, it is preferable that a circular polarized light flux enters the objective optical element, in the structure described in any one of Items 53-62.

In an objective optical element described in Item 66, it is preferable that an optical surface including the first film is a plane surface, the first film transmits the second light flux going toward the second optical information recording medium when the second light flux goes from the optical surface including the first film to outside of the objective optical element at an angle less than θ2e, and does not transmit the second light flux going toward the second optical information recording medium when the second light flux goes from the optical surface including the first film to outside of the objective optical element at an angle equal to θ2e or more, and the θ2e satisfies 35 degrees≦θ2e≦45 degrees, in the structure described in Item 65.

In an objective optical element described in Item 67, it is preferable that an optical surface including the first film is a plane surface, the first film transmits the second light flux reflected by the information recording surface of the second optical information recording medium when the second light flux enters from outside of the objective optical element into the optical surface including the first film at an angle less than θ2f, and does not transmit the second light flux reflected by the information recording surface of the second optical information recording medium when the second light flux enters from outside of the objective optical element into the optical surface including the first film at an angle equal to θ2f or more, and the θ2f satisfies 35 degrees≦θ2f≦45 degrees, in the structure described in Item 65 or Item 66.

In an objective optical element described in Item 68, it is preferable that an optical surface including the second film is a plane surface, the second film transmits the third light flux going toward the third optical information recording medium when the third light flux goes from the optical surface including the second film to outside of the objective optical element at an angle less than a predetermined angle θ3k, and does not transmit the third light flux going toward the third optical information recording medium when the third light flux goes from the optical surface including the second film to outside of the objective optical element at an angle equal to the predetermined angle θ3k or more, and the predetermined angle θ3k satisfies 25 degrees≦θ3k≦35 degrees, in the structure described in any one of Items 65-67.

In an objective optical element described in Item 69, it is preferable that an optical surface including the second film is a plane surface, the second film transmits the third light flux reflected by the information recording surface of the third optical information recording medium when the third light flux enters from outside of the objective optical element into the optical surface including the second film at an angle less than a predetermined angle θ3m, and does not transmit the third light flux reflected by the information recording surface of the third optical information recording medium when the third light flux enters from outside of the objective optical element into the optical surface including the second film at an angle equal to the predetermined angle θ3m or more, and the predetermined angle θ3m satisfies 25 degrees≦θ3m≦35 degrees, in the structure described in any one of Items 65-68.

In an objective optical element described in Item 70, it is preferable that a circular polarized light flux enters the objective optical element, in the structure described in any one of Items 65-69.

In the objective optical element, it is preferable that the first-third films are formed at least two types of films having different layer constructions within the optical surface including the films of the objective optical element, and each film has a circular aperture having its center on the optical axis.

In the objective optical element, it is preferable that the film contains a low refractive index material whose refractive index n for light with $\lambda=500$ nm satisfies $1.3\leq n\leq 1.55$, and a high refractive index material whose refractive index n satisfies $1.7\leq n\leq 2.5$.

In the objective optical element, it is preferable that the low refractive index material is a material whose main component is $MgF_2$ or $SiO_2$, and the high refractive index material is a material whose main component is $TiO_2$, $Ta_2O_5$, $Nb_2O_3$, $ZrO_2$, $CeO_2$, $HfO_2$, or $CeF_3$ in the structure.

In the present specification, "the main component" is one having the highest content among components constituting the material.

In the objective optical element, it is preferable that the objective optical element is made of plastic.

In the objective optical element, it is preferable that the objective optical element is made of glass.

In the objective optical element, it is preferable that the objective optical element is made of plastic and glass.

In the objective optical element, it is preferable that the objective optical element is composed of a single optical element.

In the objective optical element, it is preferable that the objective optical element is composed of a plurality of optical elements.

An optical pickup apparatus described in Item 71 has a first light source for emitting a first light flux with a wavelength $\lambda 1$ (380 nm≦$\lambda 1$≦420 nm); a second light source for emitting a second light flux with a wavelength $\lambda 2$ ($\lambda 1<\lambda 2$); and the objective optical element described in any one of Items 1-12.

An optical pickup apparatus described in Item 72 has a first light source for emitting a first light flux with a wavelength $\lambda 1$ (380 nm≦$\lambda 1$≦420 nm); a second light source for emitting a second light flux with a wavelength $\lambda 2$ ($\lambda 1\leq\lambda 2$); and the objective optical element of any one of Items 13-26.

An optical pickup apparatus described in Item 73 has a first light source for emitting a first light flux with a wavelength $\lambda 1$; a second light source for emitting a second light flux with a wavelength $\lambda 2$ ($\lambda 1<\lambda 2$); and the objective optical element of any one of Items 27-40.

An optical pickup apparatus described in Item 74 has: a first light source for emitting a first light flux with a wavelength $\lambda 1$; a second light source for emitting a second light flux with a wavelength $\lambda 2$ ($\lambda 1<\lambda 2$); a third light source for emitting a third light flux with a wavelength $\lambda 3$ ($\lambda 1<\lambda 2<\lambda 3$ and $0.9<2\times\lambda 1/\lambda 3<1.1$); and the objective optical element of any one of Items 41-52.

An optical pickup apparatus described in Item 75 has: a first light source for emitting a first light flux with a wavelength $\lambda 1$; a second light source for emitting a second light flux with a wavelength $\lambda 2$ ($\lambda 1<\lambda 2$); a third light source for emitting a third light flux with a wavelength $\lambda 3$ ($\lambda 1<\lambda 2<\lambda 3$ and $0.9<2\times\lambda 1/\lambda 3<1.1$); and the objective optical element of any one of Items 53-64.

An optical pickup apparatus described in Item 76 has: a first light source for emitting a first light flux with a wavelength $\lambda 1$; a second light source for emitting a second light flux with a wavelength $\lambda 2$ ($\lambda 1<\lambda 2$); a third light source for emitting a third light flux with a wavelength $\lambda 3$ ($\lambda 1<\lambda 2<\lambda 3$ and $0.9<2\times\lambda 1/\lambda 3<1.1$); and the objective optical element of any one of Items 65-70.

In the present specification, an expression of the objective optical element means, in a narrow sense, an optical element having a light-converging function arranged to be closest to an optical information recording medium (which is also called an optical disc) to face it under the condition that the optical information recording medium is inserted in an optical pickup apparatus, while, the objective optical element means, in a wide sense, an optical element that can be moved together with the aforementioned optical element by an actuator, at least in its optical axis direction. In the present specification, therefore, numerical aperture NA of an objective optical element on the optical information recording medium side (image side) means numerical aperture NA of the surface closest to an optical information recording medium on the objective optical element. Further, in the present specification, necessary numerical aperture NA is assumed to show a numerical aperture prescribed by the standard of each optical information recording medium, or a numerical aperture of an objective optical element having diffraction limit capacity which makes it possible to obtain a necessary spot for conducting recording or reproducing of information, corresponding to a wavelength of a light source to be used for each optical information recording medium.

EXAMPLES

FIG. 1(a) is a diagram showing schematically the structure of optical pickup apparatus PU1 that can conduct recording and reproducing of information properly for any of high density optical disc HD (including BD or HD DVD), DVD and CD, while, FIG. 1(b) is a front view of a light source unit used for optical pickup apparatus PU1. Optical specifications of high density optical disc HD include wavelength $\lambda 1=408$ nm, thickness t1 of protective layer PL1 that is 0.1 mm or 0.6 mm, and numerical aperture NA1 that is 0.85 or 0.6-0.65, optical specifications of DVD include wavelength $\lambda 2=658$ nm, thickness t2 of protective layer PL2 that is 0.6 mm, and numerical aperture NA2 that is 0.65, and optical specifications of CD include wavelength $\lambda 3=785$ nm, thickness t3 of protective layer PL3 that is 1.2 mm, and numerical aperture NA3 that is 0.45. However, a combination of a wavelength, a thickness of a protective layer and a numerical aperture is not limited to the foregoing.

When conducting recording and reproducing of information for high density optical disc HD on the optical pickup apparatus PU1, negative lens E1 is moved to a prescribed position (position P1 in FIG. 1(a)) by uniaxial actuator AC2 so that the first light flux may emerge from expander lens EXP in a form of a parallel light flux. After that, laser module LM representing a light source is operated to cause light-emitting point EP1 to emit light. A divergent light flux emitted from the first light-emitting point EP1 is reflected by prism PS, then, passes through collimator lens COL to turn into a parallel light flux, and its diameter is expanded by expander optical system EXP, then the light flux diameter is regulated by an unillustrated diaphragm STO, thus it becomes a spot that is formed on information recording surface RL1 through the first protective layer PL1 by objective optical element OBJ that is composed of two optical elements (or one optical element). The objective optical element OBJ conducts focusing and tracking with biaxial actuator AC1 arranged on a periphery of the objective optical element OBJ. A reflected light flux modulated by information pits on the information recording surface RL1 is transmitted again through the objective optical element OBJ and the expander optical system EXP, and is made to be a converged light flux by collimator lens COL to be converged on light-receiving section DS1 after being reflected twice in prism PS. Thus, it is possible to read information recorded on high density optical disc HD by using output signals coming from the light-receiving section DS1.

In this case, spherical aberration of the spot formed on the information recording surface RL1 of the high density optical disc HD is corrected by moving positive lens E2 in the optical axis direction by uniaxial actuator AC3. Causes for generation of spherical aberration to be corrected by positional adjustment of positive lens E2 include wavelength fluctuations caused by manufacturing errors for the first light source, for example, refractive index changes and refractive index distribution of the objective optical element OBJ caused by temperature changes, focus jump between information recording layers of a high density disc of a multi-layer-recording type such as a 2-layer disc and a 4-layer disc, and thickness fluctuations and thickness distribution caused by manufacturing errors for the protective layer PL1.

Since numerical aperture NA1 of high density optical disc HD is large, if positional errors of positive lens E2 in the optical axis direction is great when correcting spherical aberration, spherical aberration is caused by magnification errors of objective optical element OBJ, and spherical aberration of a spot formed on information recording surface RL1 cannot be corrected accurately. Therefore, uniaxial actuator AC3 that drives positive lens E2 is required to have ability to control a position delicately. Further, since the rotating speed of high density optical disc HD in the case of conducting recording and reproducing of information is high compared with conventional optical discs such as DVD and CD, an actuator capable of responding quickly is demanded for conducting correction of spherical aberration, following rotation of the high density optical disc HD. On the other hand, since the numerical aperture NA1 of high density optical disc HD is large, it is possible to generate relatively large spherical aberration only by moving positive lens E2 slightly, uniaxial actuator AC3 that drives positive lens E2 is not requested to have so large range of movement. As an actuator having such characteristics, there is a voice coil actuator or an actuator utilizing a piezo-electric element. Incidentally, when replacing optical discs each having a different protective layer thickness, it is possible to determine the initial position of positive lens E2 accurately and quickly by moving it roughly with uniaxial actuator AC2 and by moving it finely with uniaxial actuator AC3, which is preferable.

When high density optical disc HD is replaced to BD in the case of conducting recording and reproducing of information for DVD in optical pickup apparatus PU1, negative lens E1 is moved by uniaxial actuator AC2 to the position (position P2 in FIG. 1(a)) where the distance between negative lens E1 and positive lens E2 is made to be smaller than that in the case of conducting recording and reproducing of information for high density optical disc HD, so that spherical aberration caused by a difference between thickness t1 of protective layer PL1 and thickness t2 of protective layer PL2 may be corrected. After that, laser module LM is operated to drive the second light-emitting point EP2 to emit light. A divergent light flux emitted from the second light-emitting point EP2 is reflected, as its light path is drawn with dotted lines in FIG. 1(a), by prism PS, then, it passes through collimator lens COL to be changed substantially into a parallel light flux, and is transmitted through expander optical system EXP to be changed into a divergent light flux, and is regulated by objective optical element OBJ in terms of a light flux diameter to be within an aperture limit required for DVD, to become a spot formed by the objective optical element OBJ on information recording surface RL2 through the second protective layer PL2. Biaxial actuator AC1 arranged on a periphery of the objective optical element OBJ makes it to conduct focusing and tracking. A reflected light flux modulated by information pits on the information recording surface RL2 is transmitted again through the objective optical element OBJ and expander optical system EXP, and is made to be a converged light flux by collimator lens COL to be converged on light-receiving section DS2 after being reflected twice in the prism PS. Thus, information recorded on DVD can be read by using output signals coming from the light-receiving section DS2.

When conducting recording and reproducing of information for CD in optical pickup apparatus PU1, negative lens E1 is moved by uniaxial actuator AC1 to the position (position P3 in FIG. 1(a)) where the distance between negative lens E1 and positive lens E2 is made to be smaller than that in the case of conducting recording and reproducing of information for DVD, so that spherical aberration caused by a difference between thickness t1 of protective layer PL1 and thickness t3 of protective layer PL3 may be corrected. After that, laser module LM is operated to drive the third light-emitting point EP3 to emit light. A divergent light flux emitted from the third light-emitting point EP3 is reflected, as its light path is drawn with two-dot chain lines in FIG. 1(a), by prism PS, then, it passes through collimator lens COL to be changed substantially into a parallel light flux, and is transmitted through expander optical system EXP to be changed into a divergent light flux, and is regulated by objective optical element OBJ in terms of a light flux diameter to be within an aperture limit required for CD, to become a spot formed by the objective optical element OBJ on information recording surface RL3 through the third protective layer PL3. Biaxial actuator AC1 arranged on a periphery of the objective optical element OBJ makes it to conduct focusing and tracking. A reflected light flux modulated by information pits on the information recording surface RL3 is transmitted again through the objective optical element OBJ and expander optical system EXP, and is made to be a converged light flux by collimator lens COL to be converged on light-receiving section DS3 after being reflected twice in the prism PS. Thus, information recorded on CD can be read by using output signals coming from the light-receiving section DS3.

Examples of the objective optical element suited for the aforementioned embodiment will be explained as follows. Incidentally, in the following examples, an area from the optical axis to the first position corresponding to the aperture restriction of the optical disc whose numerical aperture NA is minimum is assumed to be an inner area (or a common area), an area from this first position to the second position corresponding to the aperture restriction of the optical disc whose numerical aperture NA is the second smallest is assumed to be an intermediate area (or a common area), and an area existing outside this second position is assumed to be an outer area (or an exclusive area). Further, under the condition that R1 represents a curvature of optical surface S1 positioned to be closer to the light source and R2 represents a curvature of optical surface S2 positioned to be closer to the optical information recording medium, R1>R2 is assumed be satisfied, in the following examples.

Example 1

Figure 2:
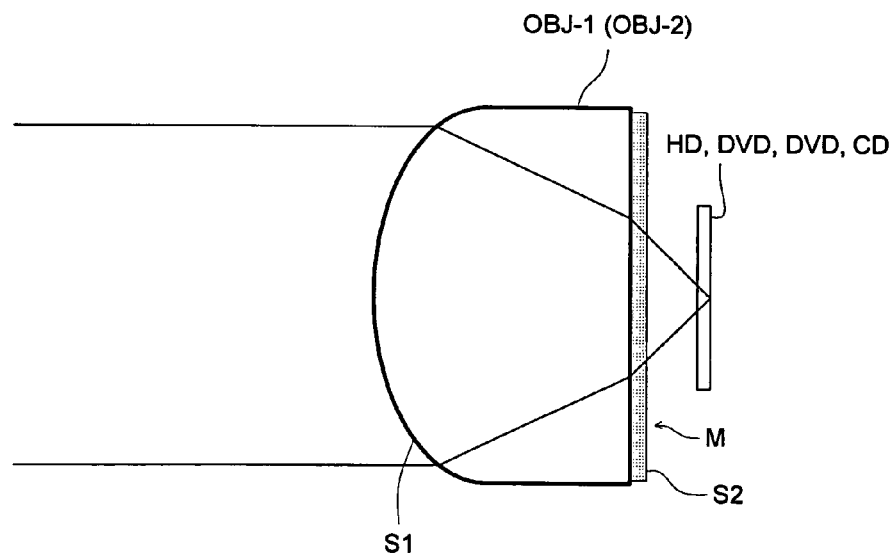
FIG. 2 shows a schematic cross section of objective lens OBJ-1 in Example 1.

FIG. 2 shows a schematic sectional form of objective optical element OBJ-1 that can be used for optical pickup apparatus PU1 shown in FIG. 1(a). A material of the objective optical element OBJ-1 is glass (refractive index 1.71), and the objective optical element OBJ-1 is composed of a single lens. The objective optical element OBJ-1 is designed as a lens (which is called a compatible lens) that is arranged in a common optical path when conducting recording and reproducing of information to be compatible for HD DVD, DVD and CD, and a numerical aperture for each of HD DVD and DVD is 0.65, and that of CD is 0.45.

When the objective optical element is made of glass, if a glass material whose transition point Tg is not higher than 400° C. is used, the objective optical element can be molded at a relatively low temperature, which may extend a life of a metallic mold. As a glass material having the low glass transition point Tg of this kind, there are available, for example, K-PG325 and K-PG375 (both represent a trade name) manufactured by SUMITA Optical Glass, Inc.

Table 1 shows a maximum incident angle for each wavelength on respectively S1 surface and S2 surface of the objective optical element OBJ-1. Table 2 shows specifications of films each covering S2 surface, and these films are arranged in a way where the film with a film number 1 adjoining the surface S2 comes first to the surface S2, and others are arranged to be farther from the surface S2 as their numbers grow greater (the same text follows).

TABLE 1

| Lens characteristics | | | |
|---|---|---|---|
| | HD | DVD | CD |
| Working wavelength (nm) | 408 | 658 | 785 |
| NA | 0.65 | 0.65 | 0.45 |
| Maximum incident angle (°) on S1 surface | 54 | 54 | 45 |
| Maximum emergence angle (°) on S2 surface | 40 | 40 | 32 |

| Coat characteristics | | | |
|---|---|---|---|
| | HD | DVD | CD |
| Working wavelength | 408 | 658 | 785 |
| NA ≦ 0.45 | A | A | A |
| 0.45 < NA ≦ 0.65 | A | A | B |

A: Transmitting
B: Not transmitting

TABLE 2

| Layer number | Constituent material | Refractive index | Layer thickness |
|---|---|---|---|
| | Air | 1 | |
| 22 | $SiO_2$ | 1.46 | 91.74 |
| 21 | $ZrO_2$ | 2.06 | 122.97 |

TABLE 2-continued

| Layer number | Constituent material | Refractive index | Layer thickness |
|---|---|---|---|
| 20 | $SiO_2$ | 1.46 | 168.53 |
| 19 | $ZrO_2$ | 2.06 | 115.75 |
| 18 | $SiO_2$ | 1.46 | 169.27 |
| 17 | $ZrO_2$ | 2.06 | 111.42 |
| 16 | $SiO_2$ | 1.46 | 170.48 |
| 15 | $ZrO_2$ | 2.06 | 108.19 |
| 14 | $SiO_2$ | 1.46 | 170.24 |
| 13 | $ZrO_2$ | 2.06 | 109.64 |
| 12 | $SiO_2$ | 1.46 | 166.83 |
| 11 | $ZrO_2$ | 2.06 | 108.7 |
| 10 | $SiO_2$ | 1.46 | 169.23 |
| 9 | $ZrO_2$ | 2.06 | 107.95 |
| 8 | $SiO_2$ | 1.46 | 169.47 |
| 7 | $ZrO_2$ | 2.06 | 109.73 |
| 6 | $SiO_2$ | 1.46 | 170.7 |
| 5 | $ZrO_2$ | 2.06 | 108.19 |
| 4 | $SiO_2$ | 1.46 | 175.07 |
| 3 | $ZrO_2$ | 2.06 | 115.39 |
| 2 | $SiO_2$ | 1.46 | 182.43 |
| 1 | $ZrO_2$ | 2.06 | 111.04 |
| | Glass | 1.71 | |

Figure 3:
FIG. 3 is a diagram showing a transmittance of a film covering the objective lens OBJ-1 for the wavelength.

FIG. 2 shows that the surface S2 is a plane surface or a plane having a small curvature. It is therefore easy to form a uniform film on the surface S2. Though the vacuum evaporation is used for forming a film in this case, other methods to form a film such as sputtering and CVD may also be used. Further, as a material with low refractive index to form a coat film, $SiO_2$ was used, and as a material with high refractive index, $ZrO_2$ was used. A preferable material with high refractive index is one wherein absorption is less in the vicinity of λ=400 nm. Other than those mentioned above, $MgF_2$ may be used as a low refractive index material, and $Ta_2O_5$, $TiO_2$, $Nb_2O_3$, $CeO_2$, $CeF_3$ and $HfO_2$ may be used as a high refractive index material. A design may be carried out so that aimed optical characteristics may be obtained corresponding to the refractive index. As a specific film forming method, after decompressing a vacuum tank housing therein objective optical elements before film forming to $1.0 \times 10^{-3}$ Pa, $ZrO_2$ was formed to be the first film under the conditions of an oxygen gas introduction amount of $1.0 \times 10^{-2}$ Pa and of an evaporation rate of 3 A/sec. $SiO_2$ was formed to be the second film under the conditions of an oxygen gas introduction amount of $1.5 \times 10^{-2}$ Pa and of an evaporation rate of 10 A/sec. Then, $ZrO_2$ and $SiO_2$ were used alternately so that 22 layers are superposed, and transmittance characteristics were measured with an incident angle to film surface of 0°, which resulted as shown in FIG. 3. Further measurement results obtained under the conditions of angles of incidence 32° and 40° are shown respectively in FIG. 4 and FIG. 5. When an incident angle is greater than 0°, there is caused a deviation between P polarized light and S polarized light, and its mean value is illustrated. The same text follows. Incidentally, an antireflection coating in a wide band was formed on the surface S1.

It is preferable that a circularly polarized light enter the objective optical element OBJ-1 in the present example. When the circularly polarized light enters, the transmittance intensity is constant, but, when a linearly polarized light enters, there is a fear that the transmittance intensity of light in the radial direction becomes uneven in a partial area of the objective optical element. The reason is that, under the conditions of specific wavelength and specific angle of incidence, there is generated a state that P polarized light is entirely transmitted, and S polarized light is not transmitted at all, or, P polarized light is substantially transmitted, and S polarized light is hardly transmitted, because P polarized light is separated to the longer wavelength side and S polarized light is separated to the shorter wavelength side, as an incident angle to the film surface grows greater. If a circularly polarized light is made to enter in this case, the transmittance intensity in the radial direction is constant, but if a linearly polarized light is made to enter, the transmittance intensity in the radial direction varies greatly. For example, let it be assumed that transmittance of P polarized light is 100% and transmittance of S polarized light is 0% under the conditions of entering of linearly polarized light, $\lambda 3=785$ nm and an incident angle 30°. If it is assumed that $\phi$ represents an angle in the radial direction and a direction that agrees with an oscillation plane of the linearly polarized light is represented by $\phi=0°$, light intensity after being transmitted through objective optical element OBJ-1 is in proportion to $(\cos \phi)^2$. Therefore, the transmittance for $\phi=0°$ and $\phi=180°$ is 100% and that for $\phi=90°$ and $\phi=270°$ is 0%, resulting in a distortion in a form of a spot that disturbs excellent recording and reproducing.

Figure 4:
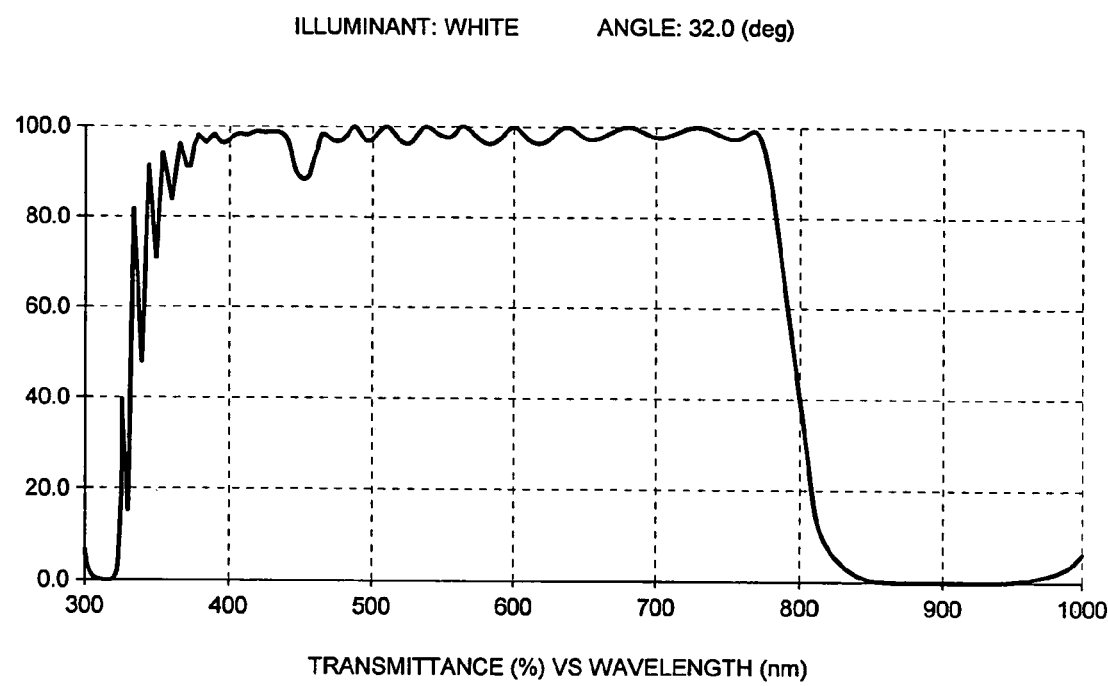
FIG. 4 is a diagram showing a transmittance of a film covering the objective lens OBJ-1 for the wavelength.
Figure 5:
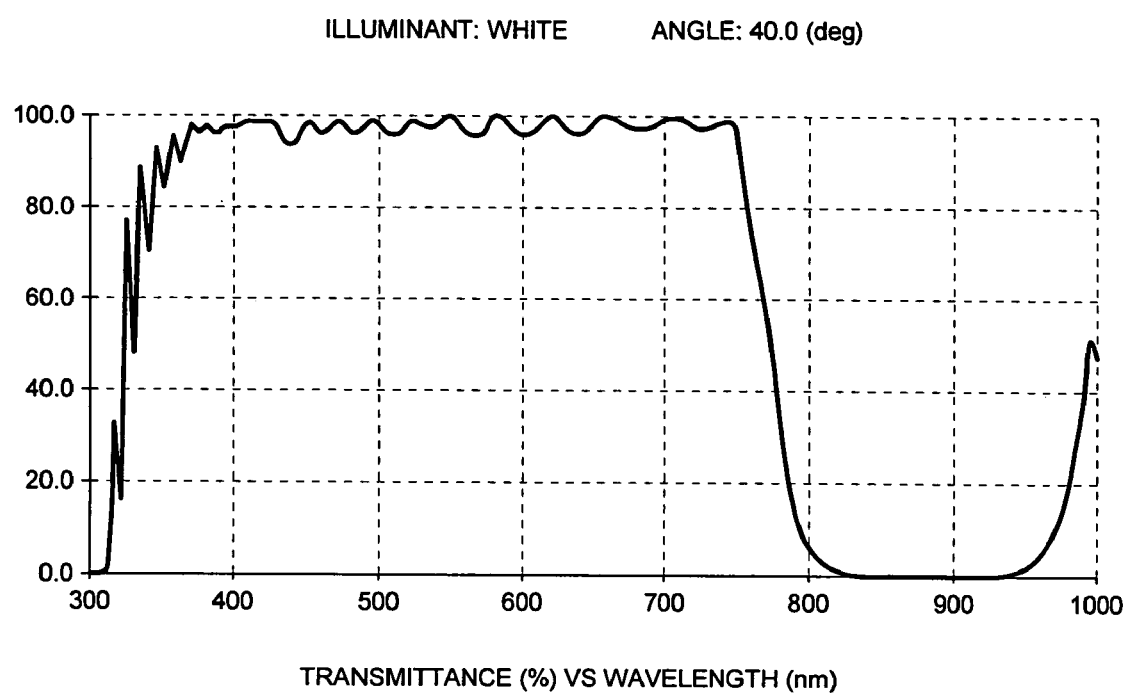
FIG. 5 is a diagram showing a transmittance of a film covering the objective lens OBJ-1 for the wavelength.

In FIGS. 3-5, with respect to the wavelength ($\lambda 1=408$ nm) to be used for HD DVD, it is always transmitted independently of the angle of incidence, and therefore, light is converged within a range of numerical aperture NA 0.65 of objective optical element OBJ-1, and an appropriate spot can be formed on an optical disc. Even in the case of the wavelength ($\lambda 2=658$ nm) to be used for DVD, it is always transmitted independently of the angle of incidence and therefore, light is converged within a range of numerical aperture NA=0.65 of objective optical element OBJ-1, and an appropriate spot can be formed on an optical disc. On the other hand, with respect to the wavelength ($\lambda 3=785$ nm) to be used for CD, rays of light that range from an incident angle of 0° to that of 32° are transmitted, and those ranging from 32° to 40° are not transmitted, or an amount of transmitted light is reduced. Namely, for CD, light is converged within a range of numerical aperture NA=0.45, and light with a numerical aperture greater than NA=0.45 is not transmitted, or an amount of transmitted light is reduced, and thus, an appropriate spot can be formed on an optical disc.

After the objective optical element OBJ-1 was installed in the optical pickup apparatus shown in FIG. 1(a), and the jitters and S-shaped characteristics were measured, there were shown satisfactory values. It was further confirmed that excellent recording and reproducing of information can be conducted for all of HD DVD, DVD and CD.

Example 2

Though a 22-layer coated film was formed in Example 1, it is also possible to make the slope of the coated film to be sharper. In this case, the slope means a degree of changes in transmittance covering from a transmission zone to a blocking zone. In Example 2, the same objective optical element OBJ-1 as in Example 1 was used.

Figure 6:
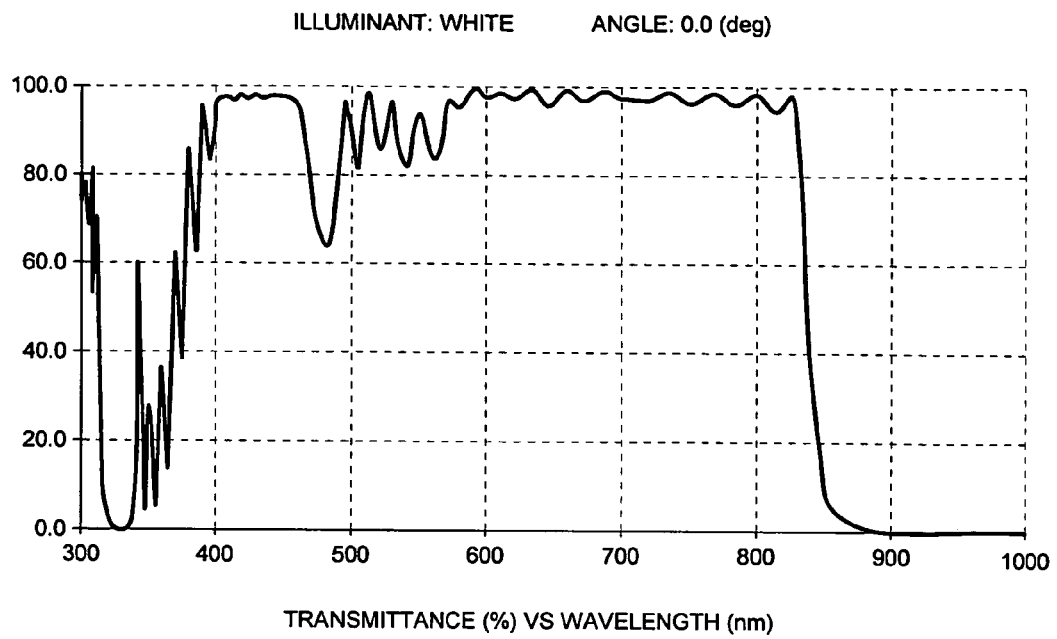
FIG. 6 is a diagram showing a transmittance of a film covering the objective lens in Example 2 for the wavelength.

A 32-layer coated film was formed through vacuum evaporation. Its specifications are shown in Table 3, and transmission characteristics with an incident angle of 0° are shown in FIG. 6. When comparing with FIG. 2 in Example 1, it is understood that the slope is sharp. Therefore, a function of aperture restriction can be strengthened, and thereby, the coated film in Example 2 is effective when characteristics higher than those in Example 1 are needed.

TABLE 3

| Layer number | Constituent material | Refractive index | Layer thickness |
|---|---|---|---|
|  | Air | 1 |  |
| 32 | $SiO_2$ | 1.46 | 82.6 |
| 31 | $ZrO_2$ | 2.06 | 124.85 |
| 30 | $SiO_2$ | 1.46 | 155.76 |
| 29 | $ZrO_2$ | 2.06 | 138.59 |
| 28 | $SiO_2$ | 1.46 | 161.36 |
| 27 | $ZrO_2$ | 2.06 | 143.14 |
| 26 | $SiO_2$ | 1.46 | 172.83 |
| 25 | $ZrO_2$ | 2.06 | 132.18 |
| 24 | $SiO_2$ | 1.46 | 184.66 |
| 23 | $ZrO_2$ | 2.06 | 118.6 |
| 22 | $SiO_2$ | 1.46 | 179.03 |
| 21 | $ZrO_2$ | 2.06 | 111.42 |
| 20 | $SiO_2$ | 1.46 | 174.46 |
| 19 | $ZrO_2$ | 2.06 | 109.49 |
| 18 | $SiO_2$ | 1.46 | 170.31 |
| 17 | $ZrO_2$ | 2.06 | 108.77 |
| 16 | $SiO_2$ | 1.46 | 170.98 |
| 15 | $ZrO_2$ | 2.06 | 106.8 |
| 14 | $SiO_2$ | 1.46 | 170.58 |
| 13 | $ZrO_2$ | 2.06 | 108.31 |
| 12 | $SiO_2$ | 1.46 | 166.96 |
| 11 | $ZrO_2$ | 2.06 | 108.26 |
| 10 | $SiO_2$ | 1.46 | 171.84 |
| 9 | $ZrO_2$ | 2.06 | 107.02 |
| 8 | $SiO_2$ | 1.46 | 167.36 |
| 7 | $ZrO_2$ | 2.06 | 110.65 |
| 6 | $SiO_2$ | 1.46 | 171.29 |
| 5 | $ZrO_2$ | 2.06 | 108.44 |
| 4 | $SiO_2$ | 1.46 | 175.85 |
| 3 | $ZrO_2$ | 2.06 | 116.37 |
| 2 | $SiO_2$ | 1.46 | 184.35 |
| 1 | $ZrO_2$ | 2.06 | 110.98 |
|  | Glass | 1.71 |  |

Example 3

Figure 7:
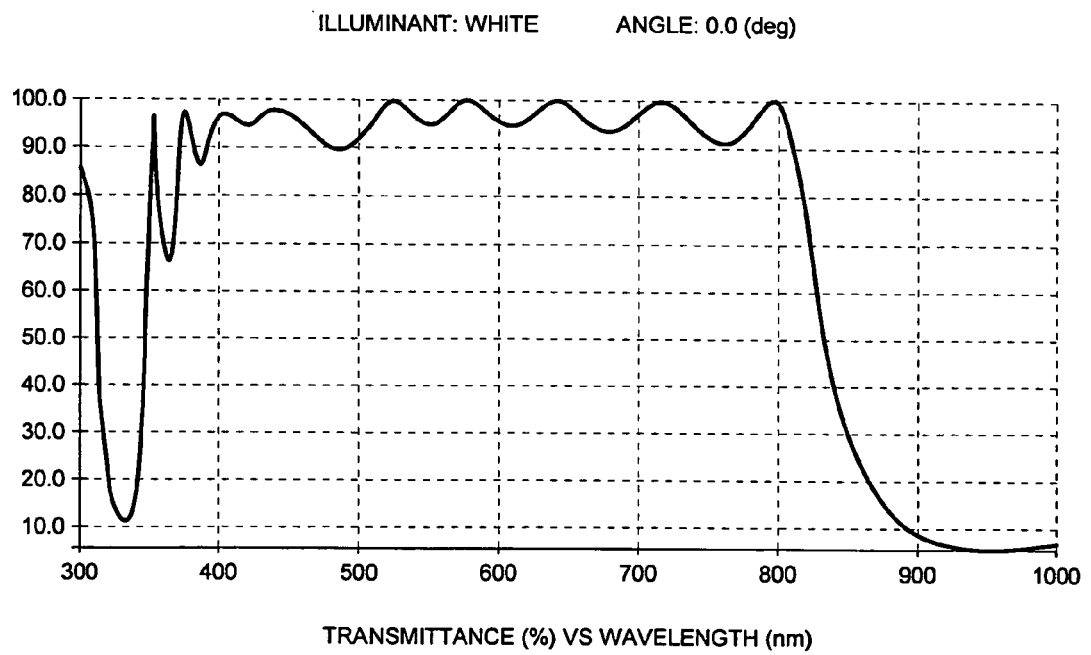
FIG. 7 is a diagram showing a transmittance of a film covering the objective lens in Example 3 for the wavelength.

Though a 22-layer coated film was formed in Example 1, it is also possible to reduce cost by decreasing the number of layers of the coated film. In the Example 3, a 12-layer coated film was formed through vacuum evaporation. Its specifications are shown in Table 4, and transmission characteristics with an incident angle of 0° are shown in FIG. 7. When comparing with FIG. 2 in Example 1, it is understood that the slope is gentle. Therefore, it is possible to reduce cost by halving the number of layers substantially to 12 layers, when compared with that in Example 1, although the function of the aperture restriction is lowered slightly, and thereby, the coated film in Example 3 is effective when excellent recording and reproducing are needed even when a function of aperture restriction is made to be lower than that in Example 1.

TABLE 4

| Layer number | Constituent material | Refractive index | Layer thickness |
|---|---|---|---|
|  | Air | 1 |  |
| 12 | $SiO_2$ | 1.46 | 66.99 |
| 11 | $ZrO_2$ | 2.06 | 91.74 |
| 10 | $SiO_2$ | 1.46 | 181.69 |
| 9 | $ZrO_2$ | 2.06 | 110.01 |
| 8 | $SiO_2$ | 1.46 | 172.69 |
| 7 | $ZrO_2$ | 2.06 | 108.16 |
| 6 | $SiO_2$ | 1.46 | 171.04 |
| 5 | $ZrO_2$ | 2.06 | 109.81 |
| 4 | $SiO_2$ | 1.46 | 170.98 |

TABLE 4-continued

| Layer number | Constituent material | Refractive index | Layer thickness |
|---|---|---|---|
| 3 | $ZrO_2$ | 2.06 | 111.98 |
| 2 | $SiO_2$ | 1.46 | 183.18 |
| 1 | $ZrO_2$ | 2.06 | 111.57 |
|  | Glass | 1.71 |  |

Example 4

A material of the objective optical element OBJ-2 relating to Example 4 is optical plastic (refractive index 1.51) and the objective optical element is composed of a single lens. Since its form itself is the same as that of the objective optical element OBJ-1 shown in FIG. 2, an illustration is omitted. When forming an objective optical element with plastic, it is preferable to use cyclic-olefin-based plastic materials, and in cyclic-olefin-based plastics, it is more preferable to use plastic materials wherein refractive index $N_{405}$ for wavelength 405 nm at temperature 25° C. is in a range from 1.54 to 1.60, rate of change of refractive index $dN_{405}/dT$ (° $C.^{-1}$) for wavelength 405 nm caused by temperature changes within a temperature range from −5° C. to 70° C. is within a range from $-10\times10^{-5}$ to $-8\times10^{-5}$.

Incidentally, specific gravity of a glass lens is generally greater than that of a plastic lens, and therefore, if an objective optical element is made of glass, weight thereof grows greater, and more load is applied on an actuator that drives the objective optical element. Therefore, when the objective optical element is made to be a glass lens, it is preferable to use a glass material whose specific gravity is small. To be concrete, it is preferable that specific gravity is not more than 3.0 and is more preferable to be not more than 2.8.

Further, as a material for the objective optical element, it is also possible to use a material wherein particles each having a diameter of 30 nm or less are dispersed in plastic material. By mixing evenly plastic materials whose refractive index is lowered when temperature rises and inorganic materials whose refractive index is raised when temperature rises, it is possible to make temperature-dependencies of refractive indexes for both of them to be canceled each other. This makes it possible to obtain optical materials (hereinafter referred to as "athermal resin") wherein a change of refractive index caused by temperature changes can be kept small while the moldability of the plastic material is kept.

Now, a refractive index of the objective optical element changed by temperatures will be explained. A rate of change of the refractive index for temperature changes is expressed by A shown in the following Numeral 1, when the refractive index n is differentiated by temperature T based on Lorentz-Lorenz Formula;

$$A = \frac{(n^2+2)(n^2-1)}{6n \cdot \left\{(-3\alpha) + \frac{1}{[R]} \cdot \frac{\partial [R]}{\partial T}\right\}} \quad \text{(Numeral 1)}$$

wherein, n represents a refractive index of the objective optical element for the wavelength of a laser light source, α represents the coefficient of linear expansion of the objective optical element and "R" represents a molecular refracting power of the objective optical element.

In the case of general plastic materials, contribution of the second term is small compared with the first term, and the second term can mostly be ignored accordingly. For example, in the case of acrylic resin (PMMA), if the coefficient of linear expansion α that is $7\times10^{-5}$ is substituted in the above-mentioned expression, A turns out to be $-12\times10^{-5}$, which roughly agrees with actual measurements. In this case, in athermal resins, contribution of the second term of the aforesaid expression is made to be greater substantially, by dispersing fine particles each having a diameter of not more than 30 nm in the plastic materials so that the contribution and the change by linear expansion of the first term may cancel each other. Specifically, it is preferable to control the rate of change of refractive index for temperature changes which used to be about $-12\times10^{-5}$ to be less than $10\times10^{-5}$ in terms of an absolute value. It is more preferable to control the rate of change of refractive index to be less than $8\times10^{-5}$ and is further preferable to control the rate of change of refractive index to be less than $6\times10^{-5}$, both for reducing the change of spherical aberration caused by temperature changes of the objective optical element.

For example, when fine particles of niobium oxide ($Nb_2O_5$) are dispersed in acrylic resins (PMMA), the dependency of refractive index change for temperature changes of this kind can be dissolved. A volume of plastic materials representing a base material is 80 in terms of a volume ratio, and niobium oxide is about 20 in terms of a volume ratio, and both of them are mixed evenly. Though there is a problem that fine particles easily cohere, a technology to disperse particles by giving electric charges to the surface of each particle is known, thus, necessary state of dispersion can be generated.

Incidentally, the volume ratio can be increased or decreased properly for controlling a rate of change of refractive index for temperature changes, and it is also possible to disperse nano-sized inorganic particles in plural types by blending them.

Though the volume ratio is 80:20 in the aforesaid example, it can be adjusted optionally in a range form 90:10 to 60:40. If the volume ratio is smaller than 90:10, an effect to control changes in refractive index becomes small, while, if the volume ratio exceeds 60:40, the moldability of athermal resin becomes problematic, which is not preferable.

Fine particles are preferably inorganic substances, and are oxides more preferably. It is preferable that the fine particles are oxides which are saturated in terms of oxidation and are not oxidized any more. Fine particles which are inorganic substances are preferable for controlling the reaction with plastic materials which are high molecular organic compounds to be low, and fine particles which are oxides can prevent transmittance deterioration and wavefront aberration deterioration both caused by exposure of violet laser for a longtime. In particular, under the severe conditions to be irradiated by violet laser at high temperatures, oxidization tends to be accelerated. However, the inorganic oxides of this kind can prevent transmittance deterioration and wavefront aberration deterioration both caused by oxidation.

Incidentally, if a diameter of a fine particle to be dispersed in a plastic material is large, an incident light flux tends to scatter, and transmittance of an objective optical element is lowered. Under the present condition that an output of a violet laser to be used for recording and reproducing of information is not high enough in high density optical discs, if the transmittance of an objective optical element for a violet laser light flux is low, it is disadvantageous in terms of a viewpoint of higher recording speed and compliance with multiple discs. Therefore, a diameter of a fine particle to be dispersed in a plastic material is preferably not more than 20 nm and is more preferably not more than 10-15 nm.

The objective optical element OBJ-2 in Example 4 is designed as a compatible lens for HD DVD, DVD and CD, and numerical aperture for HD DVD, DVD and CD are respectively 0.6, 0.65 and 0.45. The reason why the numerical aperture for DVD is larger than that for HD DVD is that HD DVD is exclusively for reproducing, while, DVD (DVD-R, DVD-RW, DVD+R, DVD+RW, etc.) is of a type having functions of recording and reproducing, and more amount of laser light is needed for the recording.

Figure 8:
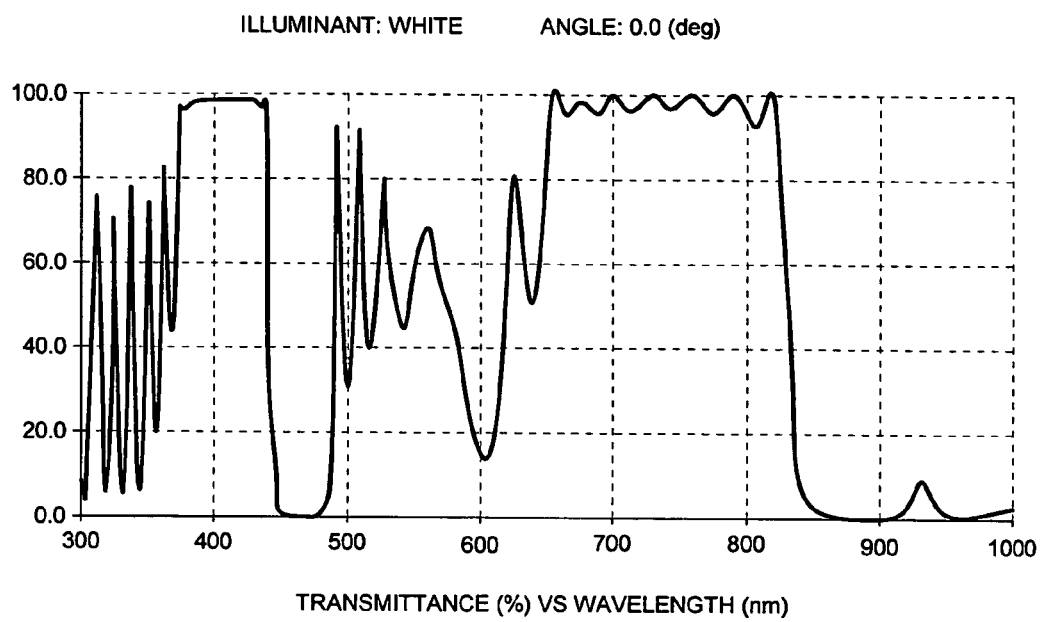
FIG. 8 is a diagram showing a transmittance of a film covering the objective lens OBJ-2 in Example 4 for the wavelength.

Table 5 shows a maximum angle of incidence of each wavelength on surface S1 and surface S2 of the objective optical element OBJ-2. On the surface S2, there was formed a coated film having specifications shown in Table 6. Though the vacuum evaporation is used for forming a film in this case, other methods to form a film such as sputtering and CVD may also be used. Further, as a material with low refractive index to form a coated film, $SiO_2$ was used, and as a material with high refractive index, $ZrO_2$ was used. A preferable material with high refractive index is one wherein absorption is less in the vicinity of $\lambda=400$ nm. Other than those mentioned above, $MgF_2$ may be used as a low refractive index material, and $Ta_2O_5$, $TiO_2$, $Nb_2O_3$, $CeO_2$, $CeF_3$ and $HfO_2$ may be used as a high refractive index material. A design may be carried out so that aimed optical characteristics may be obtained corresponding to the refractive index. As a specific film forming method, after decompressing a vacuum tank housing therein objective optical elements before film forming to $1.0 \times 10^{-3}$ Pa, $ZrO_2$ was formed to be the first film under the conditions of an oxygen gas introduction amount of $1.0 \times 10^{-2}$ Pa and of an evaporation rate of 3 A/sec. Next, $SiO_2$ was formed on the second layer under the conditions of an oxygen gas introduction amount of $1.5 \times 10^{-2}$ Pa and of an evaporation rate of 10 A/sec. Then, $ZrO_2$ and $SiO_2$ were used alternately so that 34 layers are superposed. Incidentally, when a base material is optical plastic, a temperature up to which the heating is allowed during evaporation is limited to about 90° C., though it varies depending on materials. Therefore, there is a problem that the coated film is weak in terms of quality, and a crack tends to be caused on the coated film preserved at a high temperature. In that case, the problem can be solved by the method to adjust an amount of introduction of oxygen gas and thereby to bring a stress close to 0, or by providing a contact layer having a refractive index similar to that of the base material between the base material (lens) and a film material of the first layer. Transmittance characteristics were measured with an incident angle to film surface of 0°, which resulted as shown in FIG. 8. Further measurement results obtained under the conditions of angles of incidence 30° and 40° are shown respectively in FIG. 9 and FIG. 10. On the surface S1, there was formed an antireflection coating of wide band. In the same way as in Example 1, it is desirable that circularly polarized light enters the objective optical element OBJ-2 in the present example, because, there is a fear that transmission intensity of light in the radial direction becomes uneven in a partial area of the objective optical element when linear polarized light enters, although transmission intensity of light in the radial direction becomes constant when the circularly polarized light enters.

TABLE 5

| Lens characteristics | | | |
|---|---|---|---|
| | HD | DVD | CD |
| Working wavelength (nm) | 408 | 658 | 785 |
| NA | 0.6 | 0.65 | 0.45 |
| Maximum angle of incidence (°) on surface S1 | 54 | 60 | 45 |
| Maximum angle of emergence (°) on surface S2 | 40 | 45 | 30 |

| Coat characteristics | | | |
|---|---|---|---|
| | HD | DVD | CD |
| Working wavelength | 408 | 658 | 785 |
| NA ≦ 0.45 | A | A | A |
| 0.45 < NA ≦ 0.6 | A | A | B |
| 0.6 < NA ≦ 0.65 | B | A | B |

A: Transmitting
B: Not transmitting

TABLE 6

| Layer number | Constituent material | Refractive index | Coating thickness |
|---|---|---|---|
| | Air | 1 | |
| 34 | $SiO_2$ | 1.46 | 72.08 |
| 33 | $ZrO_2$ | 2.06 | 120.06 |
| 32 | $SiO_2$ | 1.46 | 262.68 |
| 31 | $ZrO_2$ | 2.06 | 28.27 |
| 30 | $SiO_2$ | 1.46 | 137.26 |
| 29 | $ZrO_2$ | 2.06 | 42.12 |
| 28 | $SiO_2$ | 1.46 | 237.43 |
| 27 | $ZrO_2$ | 2.06 | 162.42 |
| 26 | $SiO_2$ | 1.46 | 110.81 |
| 25 | $ZrO_2$ | 2.06 | 38.92 |
| 24 | $SiO_2$ | 1.46 | 411.2 |
| 23 | $ZrO_2$ | 2.06 | 27 |
| 22 | $SiO_2$ | 1.46 | 81.44 |
| 21 | $ZrO_2$ | 2.06 | 77.72 |
| 20 | $SiO_2$ | 1.46 | 96.2 |
| 19 | $ZrO_2$ | 2.06 | 41.39 |
| 18 | $SiO_2$ | 1.46 | 256.48 |
| 17 | $ZrO_2$ | 2.06 | 134.25 |
| 16 | $SiO_2$ | 1.46 | 112.61 |
| 15 | $ZrO_2$ | 2.06 | 153.95 |
| 14 | $SiO_2$ | 1.46 | 105.01 |
| 13 | $ZrO_2$ | 2.06 | 143.46 |
| 12 | $SiO_2$ | 1.46 | 110.53 |
| 11 | $ZrO_2$ | 2.06 | 151.46 |
| 10 | $SiO_2$ | 1.46 | 109.24 |
| 9 | $ZrO_2$ | 2.06 | 141.46 |
| 8 | $SiO_2$ | 1.46 | 113.62 |
| 7 | $ZrO_2$ | 2.06 | 177.33 |
| 6 | $SiO_2$ | 1.46 | 47.79 |
| 5 | $ZrO_2$ | 2.06 | 120.54 |
| 4 | $SiO_2$ | 1.46 | 173.03 |
| 3 | $ZrO_2$ | 2.06 | 125.11 |
| 2 | $SiO_2$ | 1.46 | 177.74 |
| 1 | $ZrO_2$ | 2.06 | 108.22 |
| | Plastic | 1.51 | |

Figure 9:
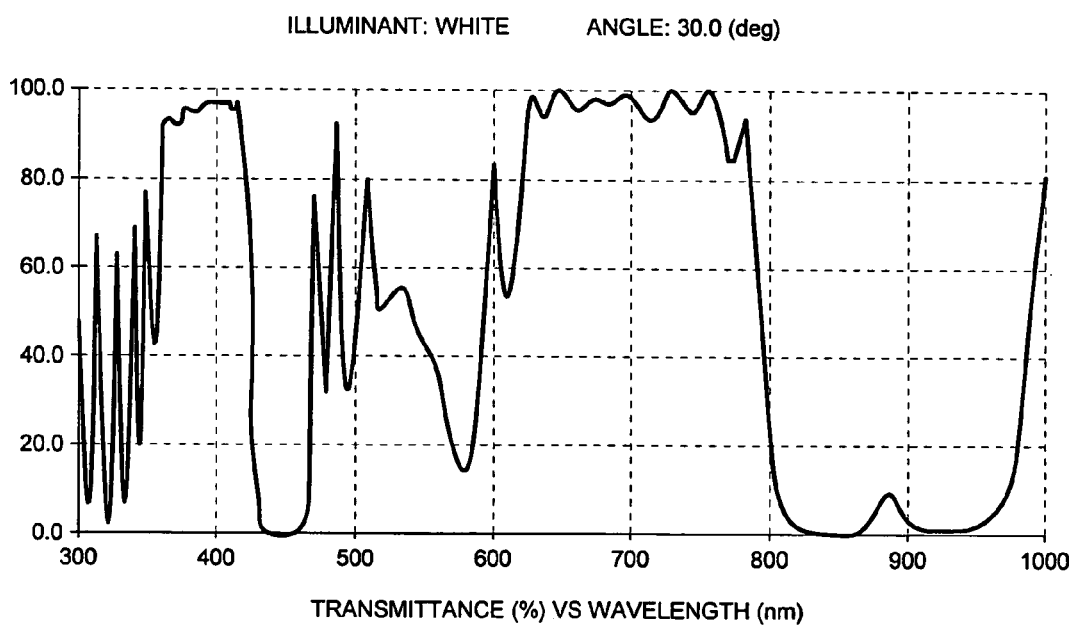
FIG. 9 is a diagram showing a transmittance of a film covering the objective lens OBJ-2 in Example 4 for the wavelength.
Figure 10:
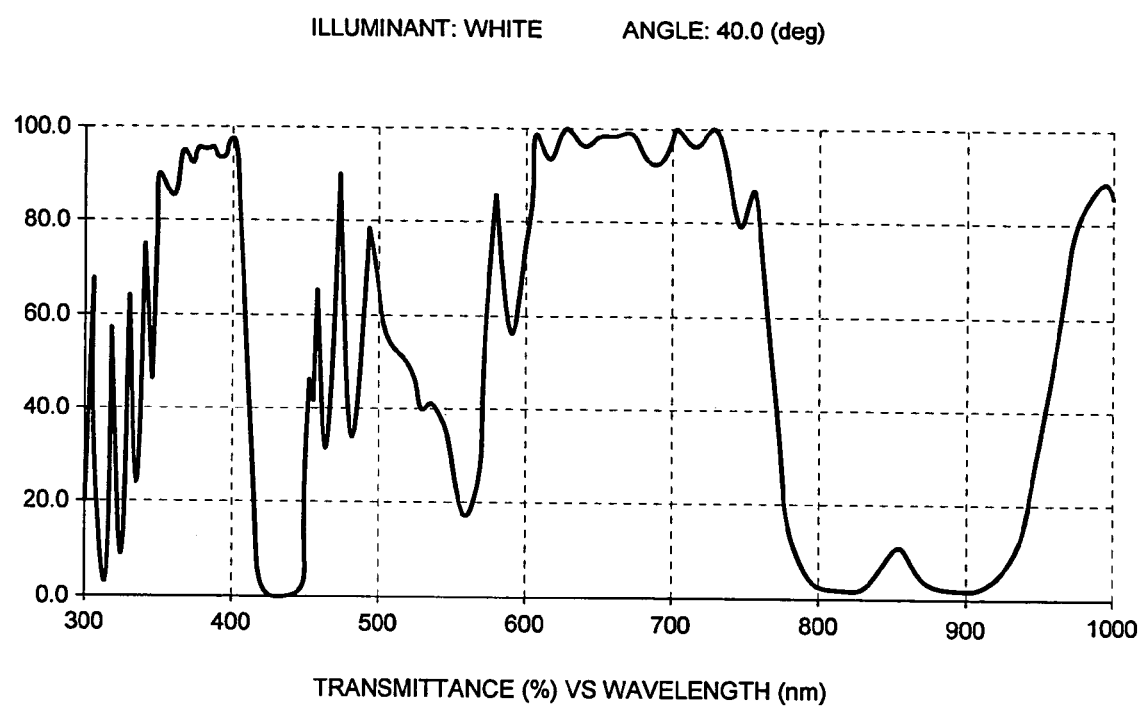
FIG. 10 is a diagram showing a transmittance of a film covering the objective lens OBJ-2 in Example 4 for the wavelength.

According to FIGS. 8-10, with respect to wavelength ($\lambda 2=658$ nm) to be used for DVD, it is always transmitted independently of an incident angle, thus, light can be converged within a range of numerical aperture NA=0.65, to be formed on its information recording surface as a spot. With respect to wavelength ($\lambda 1=408$ nm) to be used for HD DVD, it is possible to make light with an incident angle 0°-40° to be transmitted and to make light with an incident angle 40°-45° not to be transmitted, or to make an amount of transmitted light to be reduced. Namely, in the case of HD DVD, it is possible to converge light within a range of numerical aperture NA=0.60, and to make light with numerical aperture greater than NA=0.60 not to be transmitted, or to make an amount of transmitted light to be reduced to form a spot on its information recording surface. On the other hand, with respect to wavelength ($\lambda 3$=785 nm) to be used for CD, it is possible to make light with an angles of incidence 0°-30° to be transmitted and to make light with an incident angle 30°-45° not to be transmitted, or to make an amount of transmitted light to be reduced. Namely, in the case of CD, it is possible to converge light within a range of numerical aperture NA=0.45, and to make light with numerical aperture greater than NA=0.45 not to be transmitted, or to make an amount of transmitted light to be reduced to form a spot on its information recording surface.

After the objective optical element OBJ-2 was installed in the optical pickup apparatus PU1, and the jitters and S-shaped characteristics were measured, there were shown satisfactory values. It was further confirmed that excellent recording and reproducing of information can be conducted for all of HD DVD, DVD and CD.

Example 5

Figure 11:
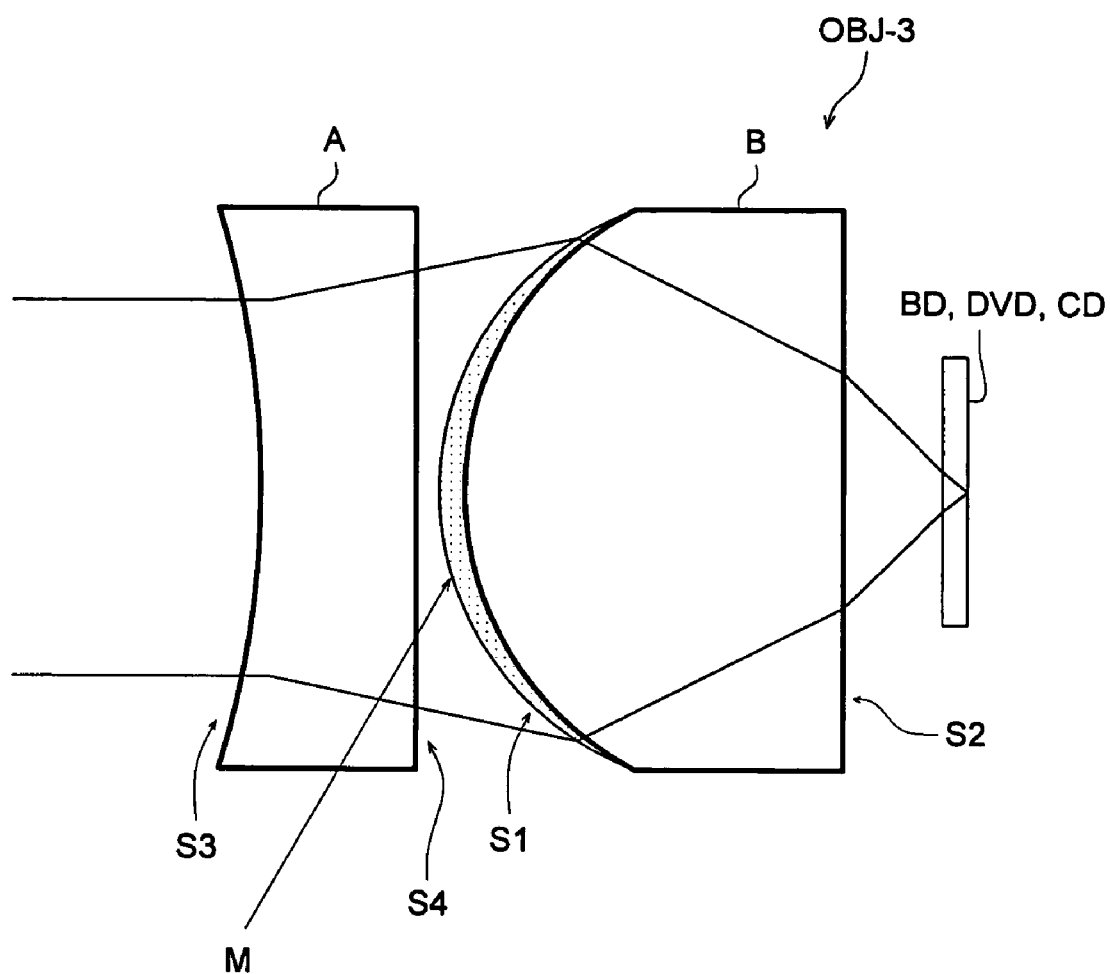
FIG. 11 shows a schematic cross section of objective lens OBJ-3 in Example 5.

FIG. 11 shows a schematic cross sectional form of objective optical element OBJ-3. The objective optical element OBJ-3 is composed of two lenses, and with respect to their materials, optical plastic (refractive index 1.51) is for element A on the light source side and glass (refractive index 1.71) is for element B on the optical disc side. This objective optical element OBJ-3 is designed as a compatible lens for BD, DVD and CD, and numerical apertures of them are respectively 0.85, 0.65 and 0.51.

Table 7 shows a maximum angle of incidence and a maximum facial angle for each wavelength on surfaces S1 and S2 of the objective optical element OBJ-3. The maximum facial angle is a maximum angle formed between an optical axis of the objective optical element and a surface normal within an effective diameter. Table 7 tells that a curvature of the surface S1 is great. Therefore, it is difficult to form a uniform film on the surface S1. In general, on the surface having a large curvature as surface S1 shown in FIG. 11, a coating thickness is smaller on the outer periphery of the lens, compared with that on the optical axis (central portion of the lens). The coating thickness is close to cos ($\frac{3}{4} \times \theta s$) under the condition that $\theta s$ represents a facial angle of the lens when coating thickness on the optical axis (central portion of the lens) is 1. Namely, the coating thickness on the optical surface at the position where a facial angle is 60° is cos($\frac{3}{4} \times 60$)=cos(45) =0.707, which means that the aforementioned coating thickness is thinner than that on the optical axis (central portion of the lens) by about 30%. The foregoing is for the occasion of vacuum evaporation, and for the occasion of sputtering and CVD, the same coating thickness reduction is sometimes caused under the same film forming condition, and more uniform film can be formed in other occasions. Even in the case of vacuum evaporation, the coating thickness is sometimes greater than cos($\frac{3}{4} \times \theta s$), and it is smaller than cos($\frac{3}{4} \times \theta s$) in other occasions, and in the invention, a vacuum evaporation equipment realizing cos($\frac{3}{4} \times \theta s$) was used.

TABLE 7

| Lens characteristics | | | |
|---|---|---|---|
| | Blu-Ray | DVD | CD |
| Working wavelength (nm) | 408 | 658 | 785 |
| NA | 0.85 | 0.65 | 0.51 |
| Maximum angle of incidence (°) on surface S1 | 65 | 54 | 45 |
| Maximum angle of emergence (°) on surface S2 | 58 | 40 | 32 |
| Maximum facial angle on surface S1 | 62 | 51 | 42 |
| Maximum facial angle on surface S2 | 5 or less | 5 or less | 5 or less |

| Coat characteristics | | | |
|---|---|---|---|
| | Blu-Ray | DVD | CD |
| Working wavelength | 408 | 658 | 785 |
| NA ≦ 0.51 | A | A | A |
| 0.51 < NA ≦ 0.65 | A | A | B |
| 0.65 < NA ≦ 0.85 | A | B | B |

A: Transmitting
B: Not transmitting

Figure 12:
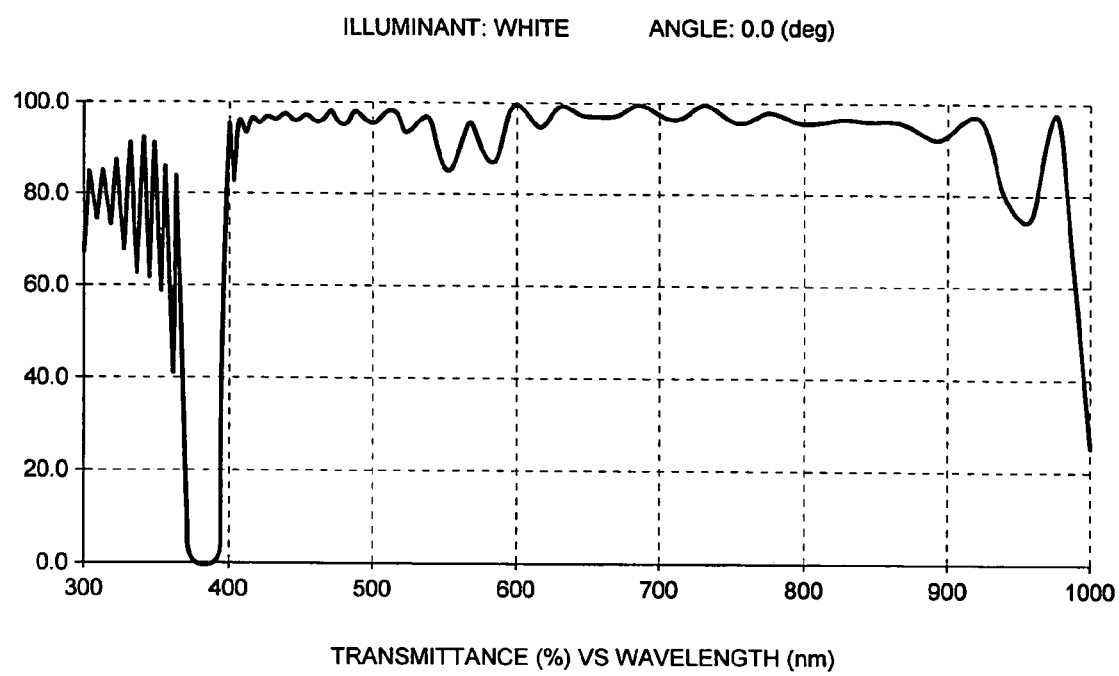
FIG. 12 is a diagram showing a transmittance of a film covering the objective lens OBJ-3 in Example 5 for the wavelength.

A coated film having specifications shown in Table 8 was formed on surface S1 of the objective optical element OBJ-3. Though the vacuum evaporation is used for forming a film in this case, other methods for forming a film such as sputtering and CVD may also be used, if it is possible to form a film wherein a coating thickness decreases at the same rate for a lens facial angle. Further, as a material with low refractive index to form a coated film, $SiO_2$ was used, and as a material with high refractive index, $ZrO_2$ was used. A preferable material with high refractive index is one wherein absorption is less in the vicinity of $\lambda$=400 nm. Other than those mentioned above, $MgF_2$ may be used as a low refractive index material, and $Ta_2O_5$, $TiO_2$, $Nb_2O_3$, $CeO_2$, $CeF_3$ and $HfO_2$ may be used as a high refractive index material. A design may be carried out so that aimed optical characteristics may be obtained corresponding to the refractive index. As a specific film forming method, after decompressing a vacuum tank housing therein objective optical elements before film forming to $1.0 \times 10^{-3}$ Pa, $ZrO_2$ was formed to be the first film under the conditions of an oxygen gas introduction amount of $1.0 \times 10^{-2}$ Pa and of an evaporation rate of 3 A/sec. $SiO_2$ was formed to be the second film under the conditions of an oxygen gas introduction amount of $1.5 \times 10^{-2}$ Pa and of an evaporation rate of 10 A/sec. Then, $ZrO_2$ and $SiO_2$ were used alternately so that 22 layers are superposed, and transmittance characteristics were measured with an incident angle to film surface of 0°, which resulted as shown in FIG. 12. Further measurement results obtained under the conditions of angles of incidence 45° and 54° are shown respectively in FIG. 13 and FIG. 14. Further, antireflection coating for wide band was formed on each of surfaces S3, S4 and S2.

TABLE 8

| Layer number | Constituent material | Refractive index | Coating thickness |
|---|---|---|---|
| | Air | 1 | |
| 22 | $SiO_2$ | 1.46 | 66.38 |
| 21 | $ZrO_2$ | 2.06 | 95.13 |
| 20 | $SiO_2$ | 1.46 | 129.34 |
| 19 | $ZrO_2$ | 2.06 | 95.4 |
| 18 | $SiO_2$ | 1.46 | 132.03 |
| 17 | $ZrO_2$ | 2.06 | 94.55 |

TABLE 8-continued

| Layer number | Constituent material | Refractive index | Coating thickness |
|---|---|---|---|
| 16 | SiO$_2$ | 1.46 | 131.72 |
| 15 | ZrO$_2$ | 2.06 | 94.94 |
| 14 | SiO$_2$ | 1.46 | 132.69 |
| 13 | ZrO$_2$ | 2.06 | 94.11 |
| 12 | SiO$_2$ | 1.46 | 133.83 |
| 11 | ZrO$_2$ | 2.06 | 93.28 |
| 10 | SiO$_2$ | 1.46 | 135.12 |
| 9 | ZrO$_2$ | 2.06 | 92.28 |
| 8 | SiO$_2$ | 1.46 | 136.55 |
| 7 | ZrO$_2$ | 2.06 | 91.31 |
| 6 | SiO$_2$ | 1.46 | 138.07 |
| 5 | ZrO$_2$ | 2.06 | 86.77 |
| 4 | SiO$_2$ | 1.46 | 149.77 |
| 3 | ZrO$_2$ | 2.06 | 85.12 |
| 2 | SiO$_2$ | 1.46 | 136.8 |
| 1 | ZrO$_2$ | 2.06 | 88.7 |
|  | Glass | 1.71 |  |

In the same way as in Example 1, it is preferable that a circularly polarized light enter the objective optical element OBJ-3 in the present example, because when the circularly polarized light enters, the transmittance intensity of light in the radial direction is constant, but, when a linearly polarized light enters, there is a fear that the transmittance intensity of light in the radial direction becomes uneven in a partial area of the objective optical element.

Figure 13:
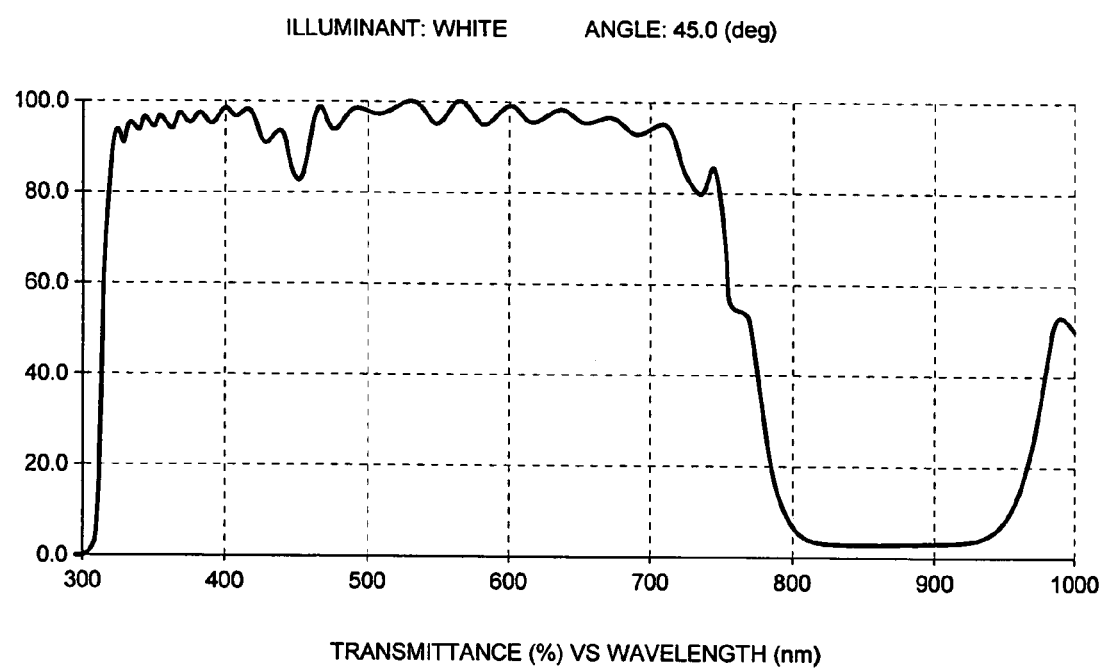
FIG. 13 is a diagram showing a transmittance of a film covering the objective lens OBJ-3 in Example 5 for the wavelength.
Figure 14:
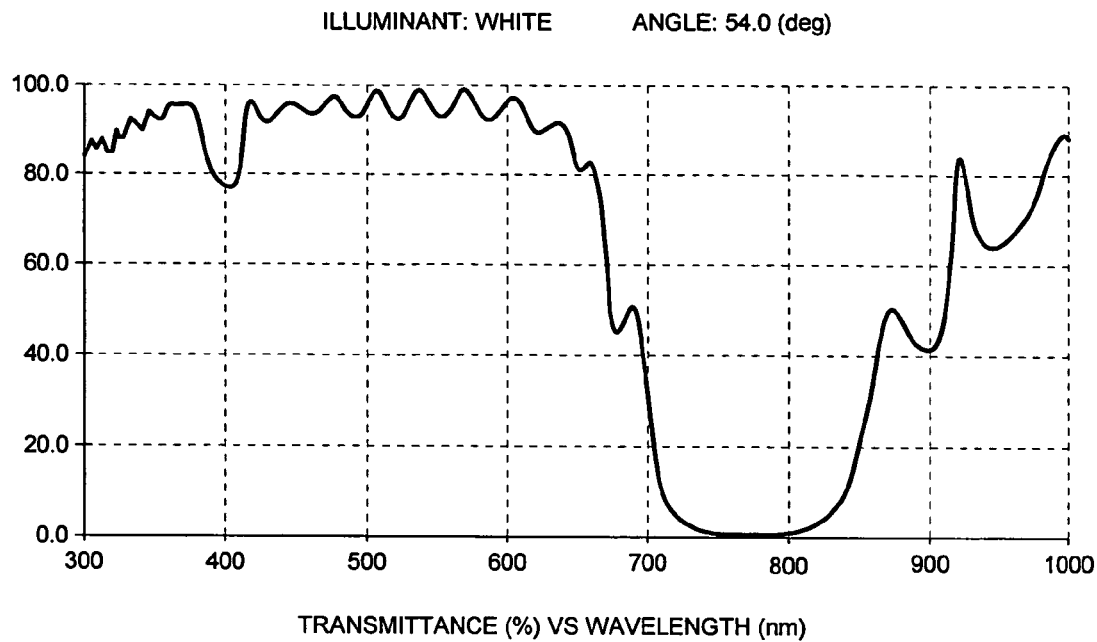
FIG. 14 is a diagram showing a transmittance of a film covering the objective lens OBJ-3 in Example 5 for the wavelength.

In FIGS. 12-14, with respect to the wavelength ($\lambda 1$=408 nm) to be used for BD, it is always transmitted independently of the angle of incidence, and therefore, light is converged within a range of numerical aperture NA=0.85 and a spot can be formed on its information recording surface. In the case of the wavelength ($\lambda 2$=658 nm) to be used for DVD, it is possible to make light with an incident angle 0°-54° to be transmitted and to make light with an incident angle 54°-65° not to be transmitted, or to make an amount of transmitted light to be reduced. Namely, in the case of DVD, it is possible to converge light within a range of numerical aperture NA=0.65, and to make light with numerical aperture greater than NA=0.65 not to be transmitted, or to make an amount of transmitted light to be reduced to form a spot on its information recording surface. On the other hand, with respect to wavelength ($\lambda 3$=785 nm) to be used for CD, it is possible to make light with an angles of incidence 0°-45° to be transmitted and to make light with an incident angle 45°-65° not to be transmitted, or to make an amount of transmitted light to be reduced. Namely, in the case of CD, it is possible to converge light within a range of numerical aperture NA=0.45, and to make light with numerical aperture greater than NA=0.45 not to be transmitted, or to make an amount of transmitted light to be reduced to form a spot on its information recording surface.

After the objective optical element OBJ-3 was installed in the optical pickup apparatus PU1, and the jitters and S-shaped characteristics were measured, there were shown satisfactory values. It was further confirmed that excellent recording and reproducing of information can be conducted for all of BD, DVD and CD.

Example 6

Figure 15:
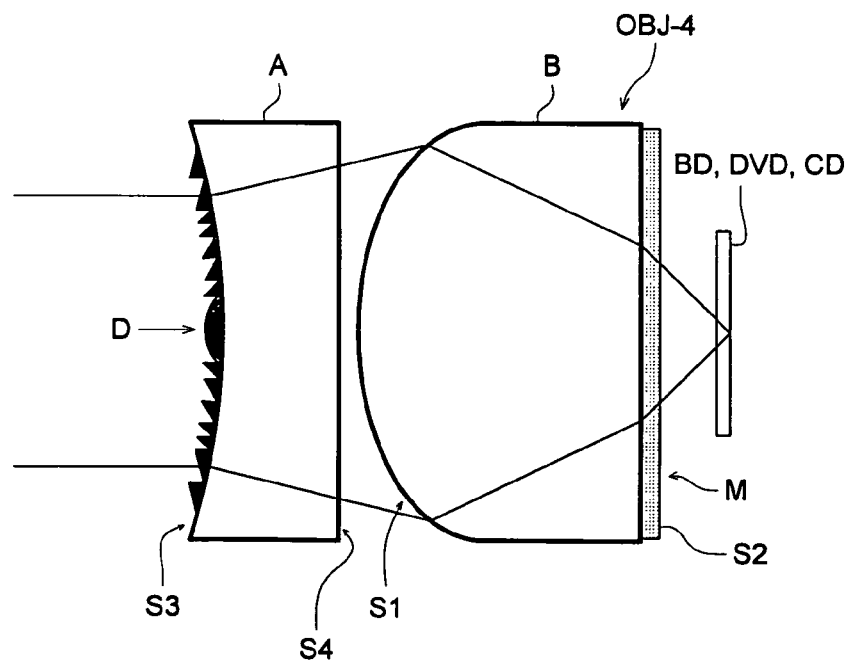
FIG. 15 shows a schematic cross section of objective lens OBJ-4 in Example 6.

FIG. 15 shows a schematic cross sectional form of objective optical element OBJ-4. The objective optical element OBJ-4 is composed of two lenses, and with respect to their materials, optical plastic (refractive index 1.51) is for element A on the light source side and glass (refractive index 1.71) is for element B on the optical disc side. This objective optical element OBJ-4 is designed as a compatible lens for BD, DVD and CD, and numerical apertures of them are respectively 0.85, 0.65 and 0.51. This objective optical element OBJ-4 has diffractive structure D that does not allow a light flux with $\lambda 2$=658 nm entering therein to be converged on an information recording surface of DVD, on an area (exclusive area) of 0.65<NA<0.85 on optical surface S3 of element A of the objective optical element. Namely, the objective optical element OBJ-4 is designed so that, when a light flux with $\lambda 2$=658 nm enters the objective optical element OBJ-4, a light flux passing through an area (common area) of 0<NA<0.65 may be converged on an information recording surface of DVD, but a light flux passing through an intermediate area of 0.65<NA<0.85 may become a flare on an information recording surface of DVD. It is generally known that diffractive structure D gives the same diffracting actions to light whose wavelength is a multiple of an integer of the design wavelength. In the present example, however, the wavelength that is a multiple of an integer of $\lambda 2$=658 nm is not used. Therefore, the wavelength of $\lambda 1$=408 nm and that of $\lambda 1$=785 nm are not influenced by diffraction.

Table 9 shows a maximum angle of incidence for each wavelength on each of surface S1 and surface S2 of the objective optical element OBJ-4. FIG. 15 shows that the surface S2 is a plane surface or a plane having a small curvature. It is therefore easy to form a uniform film on the surface S2. Coated film M having specifications shown on Table 2 was formed on the surface S2. Though the vacuum evaporation is used for forming a film in this case, other methods to form a film such as sputtering and CVD may also be used. Further, as a material with low refractive index to form a coated film, SiO$_2$ was used, and as a material with high refractive index, ZrO$_2$ was used. A preferable material with high refractive index is one wherein absorption is less in the vicinity of $\lambda$=400 nm. Other than those mentioned above, MgF$_2$ may be used as a low refractive index material, and Ta$_2$O$_5$, TiO$_2$, Nb$_2$O$_3$, CeO$_2$, CeF$_3$ and HfO$_2$ may be used as a high refractive index material. A design may be carried out so that aimed optical characteristics may be obtained corresponding to the refractive index. As a specific film forming method, after decompressing a vacuum tank housing therein objective optical elements before film forming to $1.0 \times 10^{-3}$ Pa, ZrO$_2$ was formed to be the first film under the conditions of an oxygen gas introduction amount of $1.0 \times 10^{-2}$ Pa and of an evaporation rate of 3 A/sec. SiO$_2$ was formed to be the second film under the conditions of an oxygen gas introduction amount of $1.5 \times 10^{-2}$ Pa and of an evaporation rate of 10 A/sec. Then, ZrO$_2$ and SiO$_2$ were used alternately so that 22 layers are superposed, and transmittance characteristics under the condition of an incident angle to film surface of 0°, were the same as those in FIG. 3. Further measurement results obtained under the conditions of angles of incidence 32° and 40° were the same as those respectively in FIG. 4 and FIG. 5. Incidentally, an antireflection coating in a wide band was formed on each of the surfaces S3, S4 and S1.

TABLE 9

| Lens characteristics | | | |
|---|---|---|---|
| | Blu-Ray | DVD | CD |
| Working wavelength (nm) | 408 | 658 | 785 |
| NA | 0.85 | 0.65 | 0.51 |
| Maximum angle of incidence (°) on surface S1 | 65 | 54 | 45 |
| Maximum angle of emergence (°) on surface S2 | 58 | 40 | 32 |
| Maximum facial angle on surface S1 | 62 | 51 | 42 |
| Maximum facial angle on surface S2 | 5 or less | 5 or less | 5 or less |

| Coat characteristics | | | |
|---|---|---|---|
| | Blu-Ray | DVD | CD |
| Working wavelength | 408 | 658 | 785 |
| NA ≦ 0.51 | A | A | A |
| 0.51 < NA ≦ 0.65 | A | A | B |
| 0.65 < NA ≦ 0.85 | A | — | B |

A: Transmitting
B: Not transmitting
—: Either will do

In the same way as in Example 1, it is preferable that a circularly polarized light enter the objective optical element OBJ-4 in the present example, because when the circularly polarized light enters, the transmittance intensity of light in the radial direction is constant, but, when a linearly polarized light enters, there is a fear that the transmittance intensity of light in the radial direction becomes uneven in a partial area of the objective optical element.

According to FIGS. 3-5, with respect to wavelength ($\lambda 1$=408 nm) to be used for BD, it is always transmitted independently of an incident angle, thus, light can be converged within a range of numerical aperture NA=0.85, to be formed on its information recording surface as a spot. With respect to wavelength ($\lambda 2$=658 nm) to be used for DVD, a coated film transmits light not only in a range of numerical aperture NA=0.65 but also in an outer area (exclusive area for BD) with 0.65<NA<0.85, but, the objective optical element OBJ-4 of the present example is designed so that it has diffractive structure D and a light flux with $\lambda 2$=658 nm having passed through an intermediate area with 0.65<NA<0.85 may become a flare on an information recording surface, thus, light within a range of numerical aperture NA=0.65 is converged, and a spot can be formed on its information recording surface. On the other hand, with respect to wavelength ($\lambda 3$=785 nm) to be used for CD, it is possible to make light with an angles of incidence 0°-32° to be transmitted and to make light with an incident angle 32°-60° not to be transmitted, or to make an amount of transmitted light to be reduced. Namely, in the case of CD, it is possible to converge light in an inner area with numerical aperture NA=0.45, and to make light with a numerical aperture greater than NA=0.45 not to be transmitted, or to make an amount of transmitted light to be reduced to form a spot on its information recording surface.

After the objective optical element OBJ-4 was installed in the optical pickup apparatus PU1, and the jitters and S-shaped characteristics were measured, there were shown satisfactory values. It was further confirmed that excellent recording and reproducing of information can be conducted for all of BD, DVD and CD.

Example 7

Figure 16:
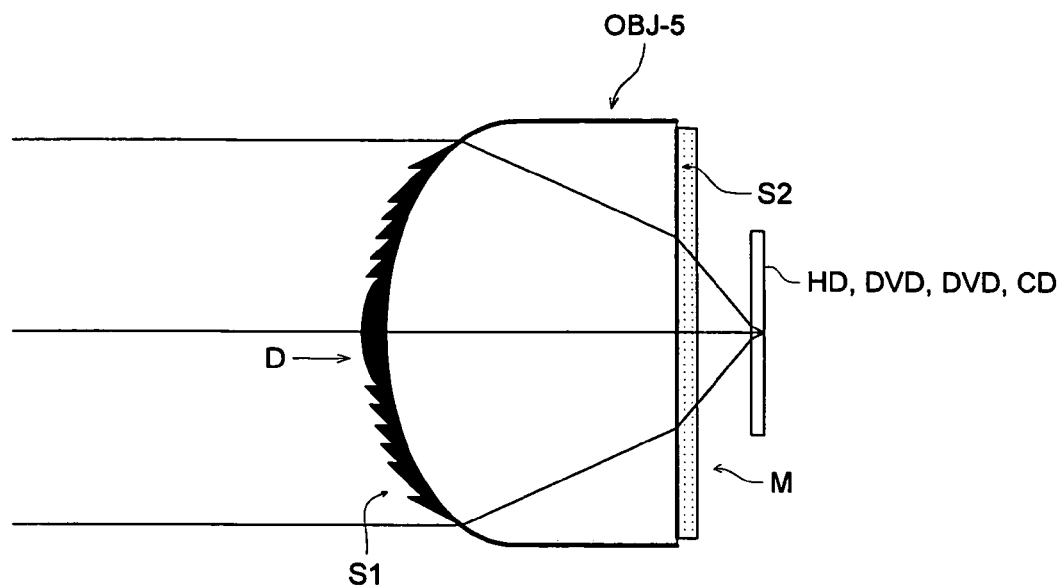
FIG. 16 shows a schematic cross section of objective lens OBJ-5 in Example 7.

FIG. 16 shows a schematic cross sectional form of objective optical element OBJ-5. The objective optical element OBJ-5 is composed of a single lens, and its material is glass (refractive index 1.71). This objective optical element OBJ-5 is designed as a compatible lens for HD DVD, DVD and CD, and numerical apertures of them are respectively 0.6, 0.65 and 0.45. This objective optical element OBJ-5 has, on its intermediate area with 0.6<NA<0.65 on optical surface S1, the diffractive structure D that does not converge a light flux with $\lambda 1$=408 nm having entered on an information recording surface. Namely, the objective optical element OBJ-5 is designed so that, when a light flux with $\lambda 1$=408 nm enters the objective optical element OBJ-5, a light flux passing through an inner area of 0<NA<0.6 and an intermediate area may be converged on an information recording surface, and a light flux passing through an outer area (DVD exclusive area) of 0.6<NA<0.65 may become a flare on an information recording surface. In general, diffractive structure D is known to give the same diffracting actions to light whose wavelength is a multiple of an integer of the design wavelength. In the present example, however, the wavelength that is close to a multiple of an integer of $\lambda 1$=408 nm is $\lambda 3$=785 nm for CD, and therefore, even for $\lambda 3$=785 nm, a light flux passing through an intermediate area with 0.6<NA<0.65 is made to be a flare on an information recording surface of CD by diffracting actions of the diffractive structure D.

Table 10 shows a maximum angle of incidence for each wavelength on each of surface S1 and surface S2 of the objective optical element OBJ-5. FIG. 16 shows that the surface S2 is a plane surface or a plane having a small curvature. It is therefore easy to form a uniform film on the surface S2. Coated film M having specifications shown on Table 2 was formed on the surface S2. Though the vacuum evaporation is used for forming a film in this case, other methods to form a film such as sputtering and CVD may also be used. Further, as a material with low refractive index to form a coated film, $SiO_2$ was used, and as a material with high refractive index, $ZrO_2$ was used. A preferable material with high refractive index is one wherein absorption is less in the vicinity of $\lambda$=400 nm. Other than those mentioned above, $MgF_2$ may be used as a low refractive index material, and $Ta_2O_5$, $TiO_2$, $Nb_2O_3$, $CeO_2$, $CeF_3$ and $HfO_2$ may be used as a high refractive index material. A design may be carried out so that aimed optical characteristics may be obtained corresponding to the refractive index. As a specific film forming method, after decompressing a vacuum tank housing therein objective optical elements before film forming to $1.0 \times 10^{-3}$ Pa, $ZrO_2$ was formed to be the first film under the conditions of an oxygen gas introduction amount of $1.0 \times 10^{-2}$ Pa and of an evaporation rate of 3 A/sec. $SiO_2$ was formed to be the second film under the conditions of an oxygen gas introduction amount of $1.5 \times 10^{-2}$ Pa and of an evaporation rate of 10 A/sec. Then, $ZrO_2$ and $SiO_2$ were used alternately so that 22 layers are superposed, and transmittance characteristics measured under the condition of an incident angle to film surface of 0°, were those shown in FIG. 3. Further measurement results obtained under the conditions of angles of incidence 32° and 40° were the same as those respectively in FIG. 4 and FIG. 5. Incidentally, an antireflection coating in a wide band was formed on surface S1.

TABLE 10

Lens characteristics

|  | HD | DVD | CD |
|---|---|---|---|
| Working wavelength (nm) | 408 | 658 | 785 |
| NA | 0.6 | 0.65 | 0.45 |
| Maximum angle of incidence (°) on surface S1 | 54 | 60 | 45 |
| Maximum angle of emergence (°) on surface S2 | 40 | 45 | 32 |

Coat characteristics

|  | HD | DVD | CD |
|---|---|---|---|
| Working wavelength | 408 | 658 | 785 |
| NA ≦ 0.45 | A | A | A |
| 0.45 < NA ≦ 0.6 | A | A | B |
| 0.6 < NA ≦ 0.65 | — | A | — |

A: Transmitting
A: Not transmitting
—: Either will do

In the same way as in Example 1, it is preferable that a circularly polarized light enter the objective optical element OBJ-5 in the present example, because when the circularly polarized light enters, the transmittance intensity of light in the radial direction is constant, but, when a linearly polarized light enters, there is a fear that the transmittance intensity of light in the radial direction becomes uneven in a partial area of the objective optical element.

According to FIGS. 3-5, with respect to wavelength ($\lambda 1$=408 nm) to be used for HD DVD, a coated film transmits light not only in a range of numerical aperture NA=0.6 but also in an outer area (exclusive area for DVD) with 0.6<NA<0.65, but, the objective optical element OBJ-5 of the present example is designed so that it has diffractive structure D and a light flux with $\lambda 1$=408 nm having passed through an outer area with 0.6<NA<0.65 may become a flare on an information recording surface, thus, light within a range of numerical aperture NA=0.6 is converged, and a spot can be formed on its information recording surface of HD DVD. With respect to wavelength ($\lambda 2$=658 nm) to be used for DVD, it is always transmitted independently of an incident angle, thus, light within a range of numerical aperture NA=0.65 is converged to be formed on its information recording surface as a spot. On the other hand, with respect to wavelength ($\lambda 3$=785 nm) to be used for CD, it is possible to make light with an incident angle 0°-32° to be transmitted and to make light with an incident angle 32°-60° not to be transmitted, or to make an amount of transmitted light to be reduced. As stated above, even for light with $\lambda 3$=785 nm, a light flux passing through an outer area of 0.6<NA<0.65 is made to be a flare by diffractive structure D, which, however, is not influenced in particular, because a coated film in the present example is designed so that its outer area of 0.6<NA<0.65 does not transmit light.

After the objective optical element OBJ-5 was installed in the optical pickup apparatus, and the jitters and S-shaped characteristics were measured, there were shown satisfactory values. It was further confirmed that excellent recording and reproducing of information can be conducted for all of HD DVD, DVD and CD.

Example 8

Figure 17:
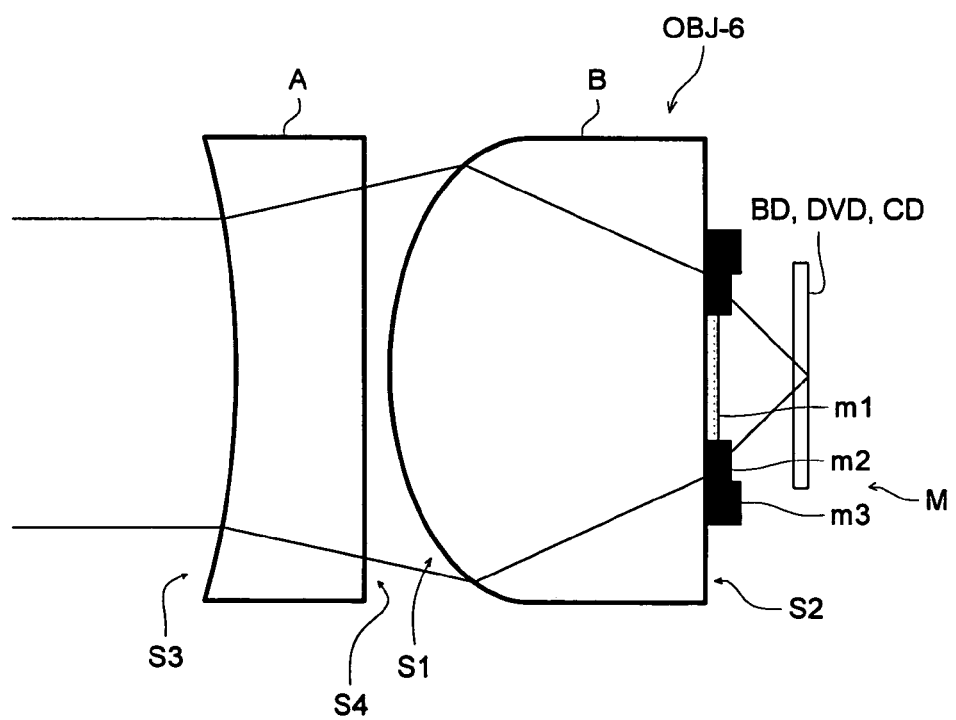
FIG. 17 shows a schematic cross section of objective lens OBJ-6 in Example 8.

FIG. 17 shows a schematic cross sectional form of objective optical element OBJ-6. The objective optical element OBJ-6 is composed of two lenses, and with respect to their materials, optical plastic (refractive index 1.51) is for element A on the light source side, and glass (refractive index 1.71) is for element B on the optical disc side. This objective optical element OBJ-6 is designed as a compatible lens for BD, DVD and CD, and numerical apertures of them are respectively 0.85, 0.65 and 0.51.

Table 11 shows a maximum angle of incidence for each wavelength on each of surface S1 and surface S2 of the objective optical element OBJ-6. FIG. 17 shows that the surface S2 is a plane surface or a plane having a small curvature. It is therefore easy to form a uniform film on the surface S2. A coated film having specifications shown on Tables 12, 13 and 14 was formed.

TABLE 11

Lens characteristics

|  | Blu-Ray | DVD | CD |
|---|---|---|---|
| Working wavelength (nm) | 408 | 658 | 785 |
| NA | 0.85 | 0.65 | 0.51 |
| Maximum angle of incidence (°) on surface S1 | 65 | 54 | 45 |
| Maximum angle of emergence (°) on surface S2 | 58 | 40 | 32 |
| Maximum facial angle (°) on surface S1 | 62 | 51 | 42 |
| Maximum facial angle (°) on surface S2 | 5 or less | 5 or less | 5 or less |

Coat characteristics

|  | Blu-Ray | DVD | CD |
|---|---|---|---|
| Working wavelength | 408 | 658 | 785 |
| NA ≦ 0.51 | A | A | A |
| 0.51 < NA ≦ 0.65 | A | A | B |
| 0.65 < NA ≦ 0.85 | A | B | B |

A: Transmitting
B: Not transmitting

TABLE 12

| Layer No. | Constituent material | Refractive index | Layer thickness |
|---|---|---|---|
|  | Air | 1 |  |
| 8 | SiO$_2$ | 1.46 | 99.8 |
| 7 | ZrO$_2$ | 2.06 | 36.35 |
| 6 | SiO$_2$ | 1.46 | 15.54 |
| 5 | ZrO$_2$ | 2.06 | 88.39 |
| 4 | SiO$_2$ | 1.46 | 15.63 |
| 3 | ZrO$_2$ | 2.06 | 41.48 |
| 2 | SiO$_2$ | 1.46 | 28.94 |
| 1 | ZrO$_2$ | 2.06 | 14.79 |
|  | Glass | 1.71 |  |

TABLE 13

| Layer No. | Constituent material | Refractive index | Layer thickness |
|---|---|---|---|
|  | Air | 1 |  |
| 14 | SiO$_2$ | 1.46 | 66.41 |
| 13 | ZrO$_2$ | 2.06 | 91.81 |
| 12 | SiO$_2$ | 1.46 | 155.05 |
| 11 | ZrO$_2$ | 2.06 | 98.86 |
| 10 | SiO$_2$ | 1.46 | 149.68 |
| 9 | ZrO$_2$ | 2.06 | 98.11 |
| 8 | SiO$_2$ | 1.46 | 148.66 |
| 7 | ZrO$_2$ | 2.06 | 97.97 |
| 6 | SiO$_2$ | 1.46 | 149.02 |

TABLE 13-continued

| Layer No. | Constituent material | Refractive index | Layer thickness |
|---|---|---|---|
| 5 | $ZrO_2$ | 2.06 | 98.9 |
| 4 | $SiO_2$ | 1.46 | 151.42 |
| 3 | $ZrO_2$ | 2.06 | 101.85 |
| 2 | $SiO_2$ | 1.46 | 162.27 |
| 1 | $ZrO_2$ | 2.06 | 112.66 |
| Phase adjusting layer | $Al_2O_3$ | 1.64 | 350 |
| | Glass | 1.71 | |

TABLE 14

| Layer No. | Constituent material | Refractive index | Layer thickness |
|---|---|---|---|
| | Air | 1 | |
| 30 | $SiO_2$ | 1.46 | 91.47 |
| 29 | $ZrO_2$ | 2.06 | 128.1 |
| 28 | $SiO_2$ | 1.46 | 143.44 |
| 27 | $ZrO_2$ | 2.06 | 98.84 |
| 26 | $SiO_2$ | 1.46 | 156.91 |
| 25 | $ZrO_2$ | 2.06 | 93.36 |
| 24 | $SiO_2$ | 1.46 | 164.17 |
| 23 | $ZrO_2$ | 2.06 | 114.76 |
| 22 | $SiO_2$ | 1.46 | 178.11 |
| 21 | $ZrO_2$ | 2.06 | 93.85 |
| 20 | $SiO_2$ | 1.46 | 144.03 |
| 19 | $ZrO_2$ | 2.06 | 96.05 |
| 18 | $SiO_2$ | 1.46 | 148.17 |
| 17 | $ZrO_2$ | 2.06 | 91.66 |
| 16 | $SiO_2$ | 1.46 | 150 |
| 15 | $ZrO_2$ | 2.06 | 93.14 |
| 14 | $SiO_2$ | 1.46 | 143.02 |
| 13 | $ZrO_2$ | 2.06 | 94.87 |
| 12 | $SiO_2$ | 1.46 | 141.59 |
| 11 | $ZrO_2$ | 2.06 | 90.21 |
| 10 | $SiO_2$ | 1.46 | 142.17 |
| 9 | $ZrO_2$ | 2.06 | 85.8 |
| 8 | $SiO_2$ | 1.46 | 130.8 |
| 7 | $ZrO_2$ | 2.06 | 73.44 |
| 6 | $SiO_2$ | 1.46 | 134.11 |
| 5 | $ZrO_2$ | 2.06 | 82.21 |
| 4 | $SiO_2$ | 1.46 | 140.96 |
| 3 | $ZrO_2$ | 2.06 | 83.02 |
| 2 | $SiO_2$ | 1.46 | 134.46 |
| 1 | $ZrO_2$ | 2.06 | 92.57 |
| Phase adjusting layer | $Al_2O_3$ | 1.64 | 460 |
| | Glass | 1.71 | |

Figure 21:
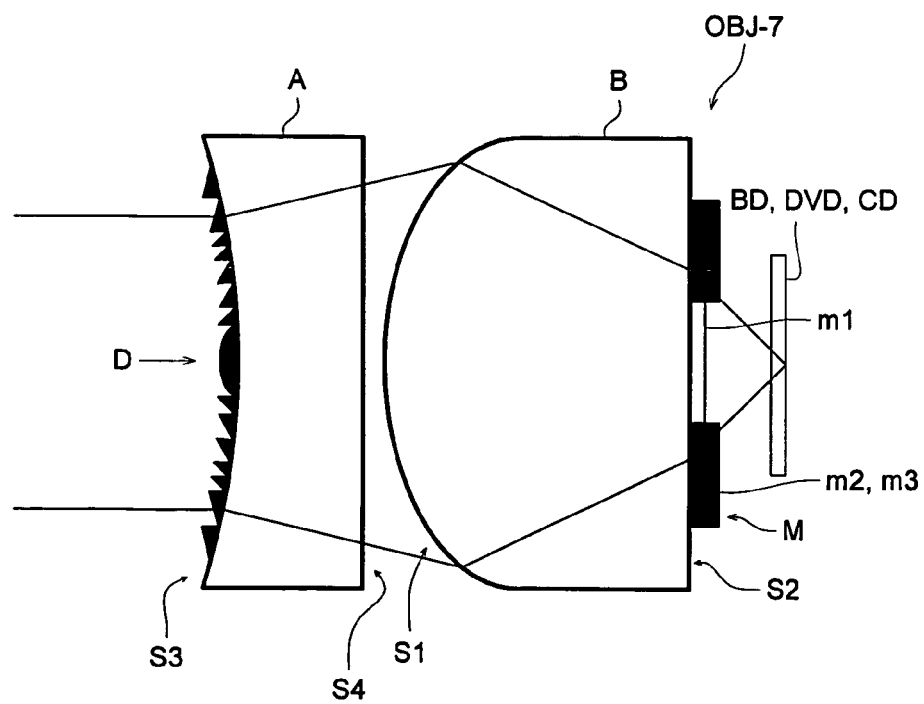
FIG. 21 shows a schematic cross section of objective lens OBJ-7 in Example 9.

Let it be assumed that the first ring-shaped zone m1 represents an inner area (angle of incidence 0°-32°) used commonly for BD, DVD and CD on surface S2, the second ring-shaped zone m2 represents an intermediate area (angle of incidence 32°-40°) used commonly for BD and DVD, and the third ring-shaped zone 3 represents an outer area (40°-58°) used exclusively for BD. An antireflection coating of a wide band shown in Table 12 was formed on the first ring-shaped zone m1, a coated film shown in Table 13 was formed on the second ring-shaped zone m2, and a coated film shown in Table 14 was formed on the third ring-shaped zone m3. Though the vacuum evaporation is used for forming a film in this case, other methods to form a film such as sputtering and CVD may also be used. Further, as a material with low refractive index to form a coated film, $SiO_2$ was used, and as a material with high refractive index, $ZrO_2$ was used. A preferable material with high refractive index is one wherein absorption is less in the vicinity of $\lambda$=400 nm. In addition to those mentioned above, $MgF_2$ may be used as a low refractive index material, and $Ta_2O_5$, $TiO_2$, $Nb_2O_3$, $CeO_2$, $CeF_3$ and $HfO_2$ may be used as a high refractive index material. A design may be carried out so that aimed optical characteristics may be obtained corresponding to the refractive index. For forming a coated film in a form of ring-shaped zone as shown in FIG. 21, a patterning technology of lift-off was used.

On the boundary (angle of incidence 32°) between the first ring-shaped zone m1 and the second ring-shaped zone m2, a phase of light of $\lambda$1=408 nm needs to be agreed with that of $\lambda$2=658 nm. Therefore, a 350 nm-thick layer of $Al_2O_3$ was formed between a base material of the second ring-shaped zone m2 and the first layer as a phase adjusting layer. The phase is expressed by $2\pi nd \cdot \cos\theta/\lambda$, wherein n represents a refractive index, d represents a layer thickness, θ represents an incident angle for each layer and λ represents a working wavelength. A thickness of the phase adjusting layer may be determined so that a boundary between the first ring-shaped zone m1 and the second ring-shaped zone m2 may be a multiple of an integer of $2\pi$ in light fluxes respectively with wavelengths of $\lambda$1=408 nm and $\lambda$2=658 nm. When adjusting to $\lambda$1=408 nm, the phase adjusting layer is 300 nm, and when adjusting to $\lambda$2=658 nm, the phase adjusting layer is 420 nm, and it is difficult to satisfy both simultaneously, thus, 350 nm which was a compromised value between them was selected. According to the experiments conducted by the inventors of the invention, the phase difference on the boundary at this time was 0.1λ or less in both wavelengths. Further, an influence of the phase adjusting layer on optical characteristics is not a problem as far as a difference of the refractive index between the phase adjusting layer and the base plate is not more than 0.1.

Figure 18:
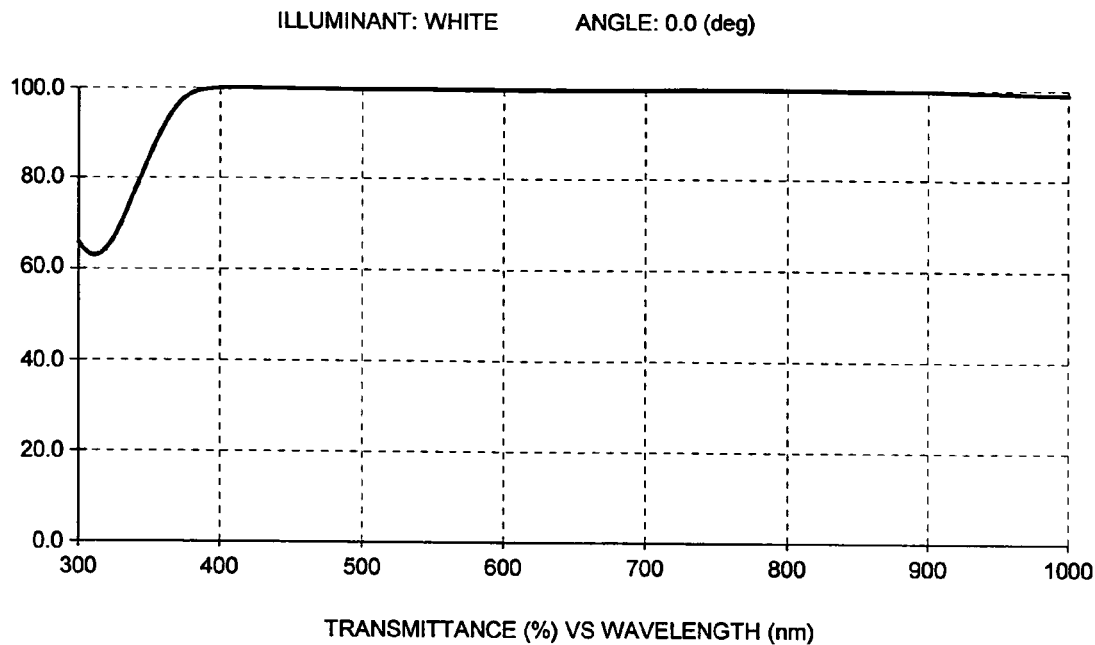
FIG. 18 is a diagram showing a transmittance of a film covering the objective lens OBJ-6 in Example 8 for the wavelength.

Even on the boundary (angle of incidence 40°) between the second ring-shaped zone m2 and the third ring-shaped zone m3, phases need to be agreed with each other at $\lambda$1=408 nm. The phase adjusting layer was made to be 460 nm after the same calculation. Incidentally, an antireflection coating in a wide band was formed on each of the surfaces S3, S4 and S1. FIG. 18 shows transmittance characteristics at angle of incidence 0°0 on the first ring-shaped zone m1, FIG. 19 shows transmittance characteristics at angle of incidence 36° on the second ring-shaped zone m2 and FIG. 20 shows transmittance characteristics at angle of incidence 50° on the third ring-shaped zone m3.

Either of a circularly polarized light and a linearly polarized light can enter the objective optical element. OBJ-6 of the present example, because of the structure wherein a wavelength and an area of an incident angle which separate P polarized light and S polarized light are not used, and transmittance intensity of light in the radial direction is constant even when a linearly polarized light enters.

Figure 19:
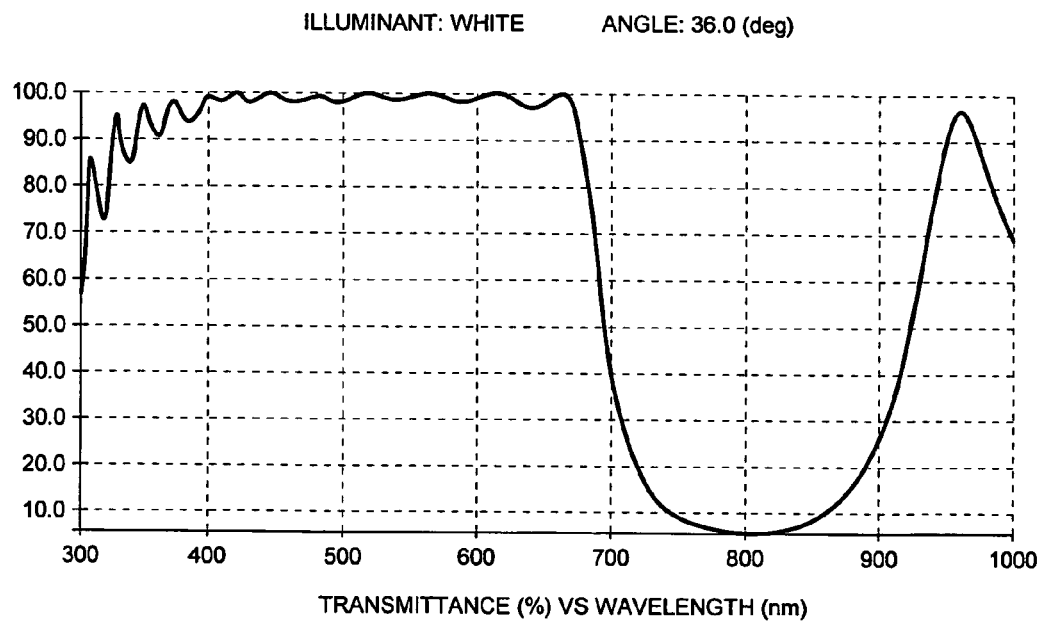
FIG. 19 is a diagram showing a transmittance of a film covering the objective lens OBJ-6 in Example 8 for the wavelength.
Figure 20:
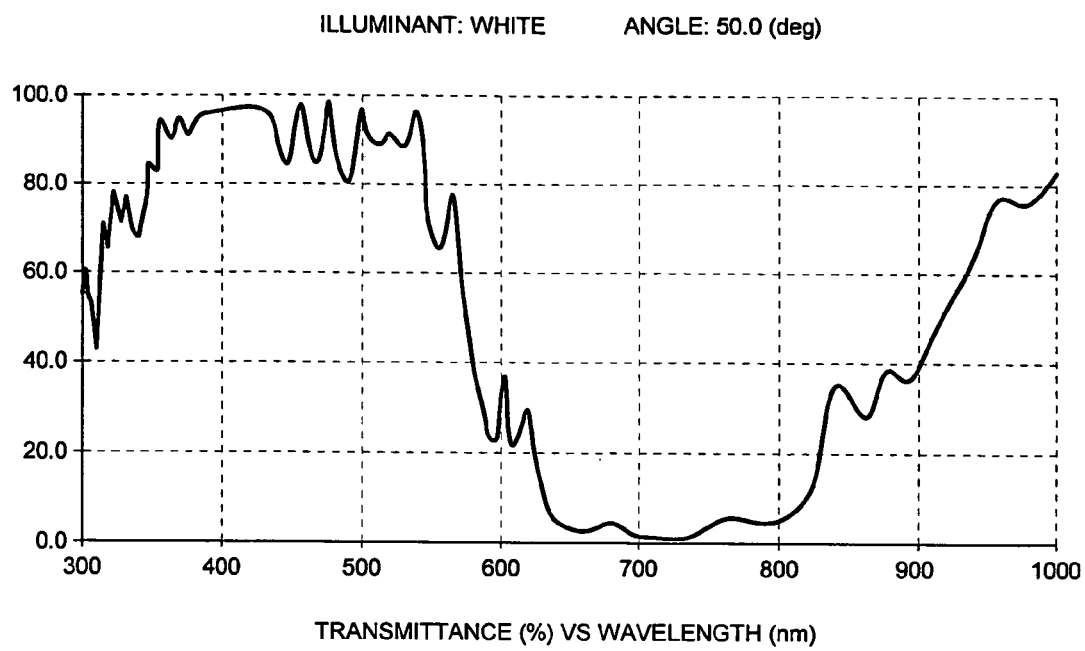
FIG. 20 is a diagram showing a transmittance of a film covering the objective lens OBJ-6 in Example 8 for the wavelength.

In FIGS. 18-20, with respect to a light flux with the wavelength ($\lambda$1=408 nm) to be used for BD, it is always transmitted independently of the angle of incidence, and therefore, light is converged within a range of numerical aperture NA=0.85, and a spot can be formed on its information recording surface. With respect to a light flux with the wavelength ($\lambda$2=658 nm) to be used for DVD, it is transmitted only through the first ring-shaped zone m1 and the second ring-shaped zone m2, and therefore, light is converged in a range of NA=0.65, and a spot can be formed on its information recording surface. With respect to a light flux with the wavelength ($\lambda$3=785 nm) to be used for CD, it is transmitted only through the first ring-shaped zone m1, and therefore, light is converged in a range of NA=0.51, and a spot can be formed on its information recording surface.

In comparison with Example 3, the objective optical element OBJ-6 of the present example needs to form three types of patterns for coated films, and cost increase is unavoidable for the objective optical element OBJ-6. However, by assigning roles of a function of aperture restriction and of a function of antireflection to coated films in three types, objective optical elements having better characteristics can be manufactured, though accurate phase adjustment and accurate patterning are requested.

After the objective optical element OBJ-6 was installed in the optical pickup apparatus, and the jitters and S-shaped characteristics were measured, there were shown satisfactory values. It was further confirmed that excellent recording and reproducing of information can be conducted for all of BD, DVD and CD.

Example 9

FIG. 21 shows a schematic cross sectional form of objective optical element OBJ-7. The objective optical element OBJ-7 is composed of two lenses, and with respect to their materials, optical plastic (refractive index 1.51) is for element A on the light source side, and glass (refractive index 1.71) is for element B on the optical disc side. This objective optical element OBJ-7 is designed as a compatible lens for BD, DVD and CD, and numerical apertures of them are respectively 0.85, 0.65 and 0.51. This objective optical element OBJ-7 has diffractive structure D that does not allow a light flux with $\lambda 2$=658 nm entering therein to be converged on an information recording surface, on an outer area (exclusive area for BD) of 0.65<NA<0.85 on optical surface S1. Namely, the diffractive structure is designed so that when light with $\lambda 2$=658 nm enters the objective optical element OBJ-7, light passing through an inner area of 0<NA<0.65 is converged on an information recording surface of DVD, and light passing through an outer intermediate area of 0.65<NA<0.85 becomes a flare on an information recording surface. Though it is generally known that diffractive structure D gives the same diffracting actions to light whose wavelength is a multiple of an integer of the design wavelength, the wavelength that is a multiple of an integer of $\lambda 2$=658 nm is not used in the present example. Therefore, the wavelength of $\lambda 1$=408 nm and that of $\lambda 1$=785 nm are not influenced by diffraction.

Table 15 shows a maximum angle of incidence for each wavelength on each of surface S1 and surface S2 of the objective optical element OBJ-7. FIG. 21 shows that the surface S2 is a plane surface or a plane having a small curvature. It is therefore easy to form a uniform film on the surface S2. A coated film having specifications shown on Tables 12 and 16 was formed on the surface S2.

TABLE 15

| Lens characteristics | Blu-Ray | DVD | CD |
|---|---|---|---|
| Working wavelength (nm) | 408 | 658 | 785 |
| NA | 0.85 | 0.65 | 0.51 |
| Maximum angle of incidence (°) on surface S1 | 65 | 54 | 45 |
| Maximum angle of emergence (°) on surface S2 | 58 | 40 | 32 |
| Maximum facial angle on surface S1 | 62 | 51 | 42 |
| Maximum facial angle on surface S2 | 5 or less | 5 or less | 5 or less |

TABLE 15-continued

| Coat characteristics | Blu-Ray | DVD | CD |
|---|---|---|---|
| Working wavelength | 408 | 658 | 785 |
| NA ≦ 0.51 | A | A | A |
| 0.51 < NA ≦ 0.65 | A | A | B |
| 0.65 < NA ≦ 0.85 | A | — | B |

A: Transmitting
B: Not transmitting
—: Either will do

Let it be assumed that the first ring-shaped zone m1 represents an inner area (angle of incidence 0°-32°) used commonly for BD, DVD and CD on surface S2, the second ring-shaped zone m2 represents an intermediate area (angle of incidence 32°-40°) used commonly for BD and DVD, and the third ring-shaped zone m3 represents an outer area (40°-58°) used exclusively for BD. A coated film as shown in Table 12 was formed on the first ring-shaped zone m1, and a coated film as shown in Table 16 was formed on the second and third ring-shaped zones m2 and m3. Though the vacuum evaporation is used for forming a film in this case, other methods to form a film such as sputtering and CVD may also be used. Further, as a material with low refractive index to form a coated film, $SiO_2$ was used, and as a material with high refractive index, $ZrO_2$ was used. A preferable material with high refractive index is one wherein absorption is less in the vicinity of $\lambda$=400 nm. In addition to those mentioned above, $MgF_2$ may be used as a low refractive index material, and $Ta_2O_5$, $TiO_2$, $Nb_2O_3$, $CeO_2$, $CeF_3$ and $HfO_2$ may be used as a high refractive index material. A design may be carried out so that aimed optical characteristics may be obtained corresponding to the refractive index. For forming a coated film in a form of ring-shaped zone as shown in FIG. 21, a patterning technology of lift-off was used. On the boundary (angle of incidence 32°) between the first ring-shaped zone m1 and the second ring-shaped zone m2, a thickness of the phase adjusting layer was made to be 300 nm to make the phase of light with $\lambda 1$=408 nm to be agreed. On the boundary (angle of incidence 40°) between the second ring-shaped zone m2 and the third ring-shaped zone m3, no phase adjustment is needed, because the same film is formed on each of the second ring-shaped zone m2 and the third ring-shaped zone m3. Incidentally, an antireflection coating of wide band was formed on each of surfaces S3, S4 and S1. Transmittance characteristics at angle of incidence 36° on the first ring-shaped zone are the same as those shown in FIG. 18, and transmittance characteristics at angle of incidence 50° on each of the second and third ring-shaped zones are the same as those shown in FIG. 19.

TABLE 16

| Layer No. | Constituent material | Refractive index | Layer thickness |
|---|---|---|---|
|  | Air | 1 |  |
| 14 | $SiO_2$ | 1.46 | 66.41 |
| 13 | $ZrO_2$ | 2.06 | 91.81 |
| 12 | $SiO_2$ | 1.46 | 155.05 |
| 11 | $ZrO_2$ | 2.06 | 98.86 |
| 10 | $SiO_2$ | 1.46 | 149.68 |
| 9 | $ZrO_2$ | 2.06 | 98.11 |
| 8 | $SiO_2$ | 1.46 | 148.66 |
| 7 | $ZrO_2$ | 2.06 | 97.97 |
| 6 | $SiO_2$ | 1.46 | 149.02 |
| 5 | $ZrO_2$ | 2.06 | 98.9 |
| 4 | $SiO_2$ | 1.46 | 151.42 |

TABLE 16-continued

| Layer No. | Constituent material | Refractive index | Layer thickness |
|---|---|---|---|
| 3 | $ZrO_2$ | 2.06 | 101.85 |
| 2 | $SiO_2$ | 1.46 | 162.27 |
| 1 | $ZrO_2$ | 2.06 | 112.66 |
| Phase adjusting layer | $Al_2O_3$ | 1.64 | 300 |
|  | Glass | 1.71 |  |

Either of a circularly polarized light and a linearly polarized light can enter the objective optical element OBJ-7 of the present example, because of the structure wherein a wavelength and an area of an incident angle which separate P polarized light and S polarized light are not used, and transmittance intensity of light in the radial direction is constant even when a linearly polarized light enters.

In FIGS. 18 and 19, with respect to a light flux with the wavelength (λ1=408 nm) to be used for BD, it is always transmitted independently of the angle of incidence, and therefore, light is converged within a range of numerical aperture NA=0.85, and a spot can be formed on its information recording surface. With respect to a light flux with the wavelength (λ2=658 nm) to be used for DVD, coated films not only on a range of numerical aperture NA=0.65 but also on an outer area (exclusive area for BD) of 0.65<NA<0.85 transmit light. However, the objective optical element OBJ-7 of the present example is designed as stated above so that it has diffractive structure D and light with λ2=658 nm becomes a flare on an information recording surface on an outer area of 0.65<NA<0.85. Therefore, it is possible to make light passing through only the first and second ring-shaped zones m1 and m2 to be converged to form a spot on its information recording surface. With respect to a light flux with the wavelength (λ3=785 nm) to be used for CD, it is possible to make it to be converged in a range of NA=0.51 to form a spot on its information recording surface.

In comparison with Example 4, the objective optical element OBJ-7 of the present example needs to form two types of patterns for coated films, and cost increase is unavoidable for the objective optical element OBJ-7. However, by assigning roles of a function of aperture restriction and of a function of antireflection to coated films in two types, objective lenses having better characteristics can be manufactured, though accurate phase adjustment and accurate patterning are requested.

After the objective optical element OBJ-7 was installed in the optical pickup apparatus, and the jitters and S-shaped characteristics were measured, there were shown satisfactory values. It was further confirmed that excellent recording and reproducing of information can be conducted for all of BD, DVD and CD.

The invention has been explained above, referring to the embodiments, to which, however, the invention is not limited, and the disclosed embodiments can naturally be modified and improved.

What is claimed is:

1. An objective optical element for use in an optical pickup apparatus having: a first light source for emitting a first light flux with a wavelength λ1 (380 nm≦λ1≦420 nm); a second light source for emitting a second light flux with a wavelength λ2 (λ1<λ2); a third light source for emitting a third light flux with a wavelength λ3 (λ1<λ2<λ3); and an objective optical element for converging the first light flux on an information recording surface of a first optical information recording medium, converging the second light flux on an information recording surface of a second information recording medium, and converging the third light flux on an information recording surface of a third optical information recording medium, the objective optical element comprising:

an optical surface including a common area and an exclusive area; and
a wavelength selective film formed on at least one of the common area and the exclusive area for transmitting at least one of the first light flux and a light flux with a wavelength excluding the wavelength λ1 selectively,
wherein the common area transmits the first light flux which is formed into a converged spot on the information recording surface of the first optical information recording medium, and
transmits the second light flux which is formed into a converged spot on the information recording surface of the second optical information recording medium, and
the exclusive area transmits the first light flux which is formed into a converged spot on the information recording surface of the first optical information recording medium, and
transmits the second light flux which is not formed into a converged spot on the information recording surface of the second optical information recording medium,
wherein the wavelength λ2 satisfies 630 nm≦λ2≦670 nm, and the wavelength λ3 satisfies 760 nm≦λ3≦800 nm, and
wherein an optical surface including the wavelength selective film of the objective optical element is a curved surface,
the wavelength selective film transmits the third light flux going toward the third optical information recording medium when the third light flux enters from outside of the objective optical element into the optical surface including the wavelength selective film at an angle less than a predetermined angle θ3g, and
does not transmit the third light flux going toward the third optical information recording medium when the third light flux enters from outside of the objective optical element into the optical surface including the wavelength selective film at an angle equal to the predetermined angle θ3g or more, and
the predetermined angle θ3g satisfies 40 degrees≦θ3g≦50 degrees.

2. The objective optical element of claim 1, wherein the common area includes an optical axis and the exclusive area is arranged outside of the common area.

3. The objective optical element of claim 1, wherein the wavelength selective film is formed of one type of film having a same layer construction within an optical surface including the wavelength selective film of the objective optical element.

4. The objective optical element of claim 1, wherein a circular polarized light flux enters into the objective optical element.

5. An objective optical element for use in an optical pickup apparatus having, a first light source for emitting a first light flux with a wavelength λ1; a second light source for emitting a second light flux with a wavelength λ2 (λ1<λ2); an objective optical element for converging the first light flux on an information recording surface of a first optical information recording medium and converging the second light flux on an information recording surface of a second information recording medium, the objective optical element comprising;

a plurality of optical surfaces including
an optical surface S2 with a curvature R2 closest to the optical information recording medium and
an optical surface S1 with a curvature R1 secondary closest to the optical information recording medium,
a common area and an exclusive area arranged on at least one of the plurality of optical surfaces; and
a film arranged at least one of the common area and the exclusive area;
wherein the objective optical element satisfies R1>R2,
the first light flux passes whole area of an effective diameter of the optical surface S1 and enters into a most outer periphery of an effective diameter of the optical surface S1 at an incident angle equal to 60 degrees or more,
the common area transmits the first light flux which is formed into a converged spot on the information recording surface of the first optical information recording medium, and
transmits the second light flux which is formed into a converged spot on the information recording surface of the second optical information recording medium,
the exclusive area transmits the first light flux which is formed into a converged spot on the information recording surface of the first optical information recording medium, and
transmits the second light flux which is not formed into a converged spot on the information recording surface of the second optical information recording medium,
the film transmits the second light flux going from the second light source to the second optical information recording medium when the second light flux enters into the optical surface S1 at an angle less than a predetermined angle $\theta 2$, and
does not transmit the second light flux going from the second light source to the second optical information recording medium when the second light flux enters into the optical surface S1 at an angle equal to the predetermined angle $\theta 2$ or more, and
the predetermined angle $\theta 2$ satisfies 25 degrees$\leqq \theta 2 \leqq$50 degrees.

6. The objective optical element of claim 5,
wherein the film is arranged on the optical surface S1.

7. The objective optical element of claim 5,
wherein the film is arranged on the optical surface S2.

8. The objective optical element of claim 5,
wherein the second light flux enters into a most outer periphery of an effective diameter of the optical surface S1 at an incident angle equal to 45 degrees or more, and less than 60 degrees.

9. The objective optical element of claim 5, further comprising: a third light source for emitting a third light flux with a wavelength $\lambda 3$ ($\lambda 1<\lambda 2<\lambda 3$),
wherein the objective optical element converges the third light flux on an information recording surface of a third optical information recording medium, and
the third light flux enters into a most outer periphery of an effective diameter of the optical surface S1 at an incident angle equal to 30 degrees or more, and less than 50 degrees.

10. The objective optical element of claim 9, further comprising: a diffractive structure arranged on one of the plurality of optical surfaces for limiting a numerical aperture for the second light flux.

11. The objective optical element of claim 9, further comprising: a diffractive structure arranged on one of the plurality of optical surfaces for limiting a numerical aperture for each of the first light flux and the third light flux.

12. The objective optical element of claim 5,
wherein the common area includes an optical axis, and the exclusive area is arranged outside of the common area.

13. The objective optical element of claim 5,
wherein the film is formed of one type of film having a same layer construction within an optical surface including the film of the objective optical element.

14. The objective optical element of claim 9,
wherein an optical surface including the film of the objective optical element is a plane surface,
the film transmits the third light flux going toward the third optical information recording medium when the third light flux goes from the optical surface including the film to outside of the objective optical element at an angle less than a predetermined angle $\theta 3e$, and
does not transmit the third light flux going to the third optical information recording medium when the third light flux goes from the optical surface including the film to outside of the objective optical element at an angle equal to the predetermined angle $\theta 3e$ or more, and
the predetermined angle $\theta 3e$ satisfies 25 degrees$\leqq \theta 3e \leqq$35 degrees.

15. The objective optical element of claim 9,
wherein an optical surface including the film of the objective optical element is a plane surface,
the film transmits the third light flux reflected by the information recording surface of the third optical information recording medium when the third light flux enters from outside of the objective optical element into the optical surface including the film at an angle less than a predetermined angle $\theta 3f$, and
does not transmit the third light flux reflected by the information recording surface of the third optical information recording medium when the third light flux enters from outside of the objective optical element into the optical surface including the film at an angle equal to the predetermined angle $\theta 3f$ or more, and
the predetermined angle $\theta 3f$ satisfies 25 degrees$\leqq \theta 3f \leqq$35 degrees.

16. The objective optical element of claim 9,
wherein an optical surface including the film of the objective optical element is a curved surface,
the film transmits the third light flux going toward the third optical information recording medium when the third light flux enters from outside of the objective optical element into the optical surface including the film at an angle less than a predetermined angle $\theta 3g$, and
does not transmit the third light flux going toward the third optical information recording medium when the third light flux enters from outside of the objective optical element into the optical surface
including the film at an angle equal to the predetermined angle $\theta 3g$ or more, and
the predetermined angle $\theta 3g$ satisfies 40 degrees$\leqq \theta 3g \leqq$50 degrees.

17. The objective optical element of claim 9,
wherein an optical surface including the film of the objective optical element is a curved surface,
the film transmits the third light flux reflected by the information recording surface of the third optical information recording medium when the third light flux goes from the optical surface including the film to outside of the objective optical element at an angle less than a predetermined angle $\theta 3h$, and
does not transmit the third light flux reflected by the information recording surface of the third optical information recording medium when the third light flux goes from the optical surface including the film to outside of the objective optical element at an angle equal to the predetermined angle θ3h or more, and the predetermined angle θ3h satisfies 40 degrees≦θ3h≦50 degrees.

18. The objective optical element of claim 5, wherein a circular polarized light flux enters into the objective optical element.

19. An objective optical element for use in an optical pickup apparatus having: a first light source for emitting a first light flux with a wavelength λ1; a second light source for emitting a second light flux with a wavelength λ2 (λ1<λ2); an objective optical element for converging the first light flux on an information recording surface of a first optical information recording medium and converging the second light flux on an information recording surface of a second information recording medium, the objective optical element comprising;

a plurality of optical surfaces including an optical surface S2 with a curvature R2 closest to the optical information recording medium and an optical surface S1 with a curvature R1 secondary closest to the optical information recording medium, a common area and an exclusive area arranged on at least one of the plurality of optical surfaces; and a film arranged at least one of the common area and the exclusive area, wherein the objective optical element satisfies R1>R2, the first light flux passes whole area of an effective diameter of the optical surface S2 and goes out of a most outer periphery of an effective diameter of the optical surface S2 at an emergence angle equal to 55 degrees or more, the common area transmits the first light flux which is formed into a converged spot on the information recording surface of the first optical information recording medium, and transmits the second light flux which is formed into a converged spot on the information recording surface of the second optical information recording medium, the exclusive area transmits the first light flux which is formed into a converged spot on the information recording surface of the first optical information recording medium, and transmits the second light flux which is not formed into a converged spot on the information recording surface of the second optical information recording medium, the film transmits the second light flux going from the second light source to the second optical information recording medium when the second light flux goes out from the optical surface S2 at an angle less than a predetermined angle θ2', and does not transmit the second light flux going from the second light source to the second optical information recording medium when the second light flux goes out from the optical surface S2 at an angle equal to the predetermined angle θ2' or more, and the predetermined angle θ2' satisfies 25 degrees≦θ2'≦50 degrees.

20. The objective optical element of claim 19, wherein the film is arranged on the optical surface S1.

21. The objective optical element of claim 19, wherein the film is arranged on the optical surface S2.

22. The objective optical element of claim 19, wherein the second light flux goes out of a most outer periphery of an effective diameter of the optical surface S2 at an emergence angle equal to 35 degrees or more, and less than 60 degrees.

23. The objective optical element of claim 19, further comprising: a third light source for emitting a third light flux with a wavelength λ3 (λ1<λ2<λ3), wherein the objective optical element converges the third light flux on an information recording surface of a third optical information recording medium, and the third light flux goes out of a most outer periphery of an effective diameter of the optical surface S2 at an emergence angle equal to 20 degrees or more, and less than 35 degrees.

24. The objective optical element of claim 23, further comprising: a diffractive structure arranged on one of the plurality of optical surfaces for limiting a numerical aperture for the second light flux.

25. The objective optical element of claim 23, further comprising: a diffractive structure arranged on one of the plurality of optical surfaces for limiting a numerical aperture for each of the first light flux and the third light flux.

26. The objective optical element of claim 19, wherein the common area includes an optical axis, and the exclusive area is arranged outside of the common area.

27. The objective optical element of claim 19, wherein the film is formed of one type of film having a same layer construction within an optical surface including the film of the objective optical element.

28. The objective optical element of claim 23, wherein an optical surface including the film of the objective optical element is a plane surface, the film transmits the third light flux going toward the third optical information recording medium when the third light flux goes from the optical surface including the film to outside of the objective optical element at an angle less than an predetermined angle θ3e, and does not transmit the third light flux going toward the third optical information recording medium when the third light flux goes from the optical surface including the film to outside of the objective optical element at an angle equal to the predetermined angle θ3e or more, and the predetermined angle θ3e satisfies 25 degrees≦θ3e≦35 degrees.

29. The objective optical element of claim 23, wherein an optical surface including the film of the objective optical element is a plane surface, the film transmits the third light flux reflected by the information recording surface of the third optical information recording medium when the third light flux enters from outside of the objective optical element into the optical surface including the film at an angle less than a predetermined angle θ3f, and does not transmit the third light flux reflected by the information recording surface of the third optical information recording medium when the third light flux enters from outside of the objective optical element into the optical surface including the film at an angle equal to the predetermined angle θ3f or more, and the predetermined angle θ3f satisfies 25 degrees≦θ3f≦35 degrees.

30. The objective optical element of claim 23, wherein an optical surface including the film of the objective optical element is a curved surface, the film transmits the third light flux going toward the third optical information recording medium when the third light flux enters from outside of the objective optical element into the optical surface including the film at an angle less than a predetermined angle θ3g, and does not transmit the third light flux going toward the third optical information recording medium when the third light flux enters from outside of the objective optical element into the optical surface including the film at an angle equal to the predetermined angle θ3g or more, and the predetermined angle θ3g satisfies 40 degrees≦θ3g≦50 degrees.

31. The objective optical element of claim 23, wherein an optical surface including the film of the objective optical element is a curved surface, the film transmits the third light flux reflected by the information recording surface of the third optical information recording medium when the third light flux goes from the optical surface including the film to outside of the objective optical element at an angle less than a predetermined angle θ3h, and does not transmit the third light flux reflected by the information recording surface of the third optical information recording medium when the third light flux goes from the optical surface including the film to outside of the objective optical element at an angle equal to the predetermined angle θ3h or more, and the predetermined angle θ3h satisfies 40 degrees≦θ3h≦50 degrees.

32. The objective optical element of claim 19, wherein a circular polarized light flux enters into the objective optical element.

33. An optical pickup apparatus comprising:

a first light source for emitting a first light flux with a wavelength λ1 (380 nm≦λ1≦420 nm);

a second light source for emitting a second light flux with a wavelength λ2 (λ1<λ2);

a third light source for emitting a third light flux with a wavelength λ3 (λ1<λ2<λ3); and the objective optical element of claim 1.

34. An optical pickup apparatus comprising:

a first light source for emitting a first light flux with a wavelength λ1 (380 nm≦λ1≦420 nm);

a second light source for emitting a second light flux with a wavelength λ2 (λ1<λ2); and the objective optical element of claim 5.

35. An optical pickup apparatus comprising:

a first light source for emitting a first light flux with a wavelength λ1;

a second light source for emitting a second light flux with a wavelength λ2 (λ1<λ2); and the objective optical element of claim 19.

* * * * *